(12) United States Patent
Stewart et al.

(10) Patent No.: US 7,644,089 B2
(45) Date of Patent: Jan. 5, 2010

(54) SYSTEM AND METHOD FOR CORPORATE-WIDE POLICY MANAGEMENT

(75) Inventors: Ford Mackinnon Stewart, Maplewood, NJ (US); Bridget Elizabeth O'Connor, South Amboy, NJ (US); Hari Gopalkrishnan, Plainboro, NJ (US); Sabet Elias, Freehold, NJ (US)

(73) Assignee: Barclays Capital, Inc., New York, NY (US)

( * ) Notice: Subject to any disclaimer, the term of this patent is extended or adjusted under 35 U.S.C. 154(b) by 0 days.

(21) Appl. No.: 11/025,871

(22) Filed: Dec. 29, 2004

(65) Prior Publication Data

US 2006/0143194 A1 Jun. 29, 2006

(51) Int. Cl.
*G06F 17/00* (2006.01)

(52) U.S. Cl. ............... 707/100; 707/1; 707/10; 707/102; 707/103 R; 707/200; 726/27; 726/28; 726/29; 726/30

(58) Field of Classification Search ........ 707/1, 707/3, 4, 100, 101, 102, 103 R, 10, 200; 705/1, 705/7, 9, 40; 709/203, 225; 715/713; 726/27, 726/28, 29, 30
See application file for complete search history.

(56) References Cited

U.S. PATENT DOCUMENTS

| 5,956,039 | A | 9/1999 | Woods et al. |
| 6,035,300 | A * | 3/2000 | Cason et al. ............. 707/102 |
| 2002/0032642 | A1 | 3/2002 | Chichilnisky |
| 2003/0101128 | A1 | 5/2003 | Abernethy |
| 2003/0135517 | A1 * | 7/2003 | Kauffman ............ 707/103 R |
| 2003/0182215 | A1 | 9/2003 | Ringler et al. |
| 2004/0059587 | A1 * | 3/2004 | Astle et al. ............. 705/1 |
| 2005/0027752 | A1 * | 2/2005 | Gelbard ............. 707/200 |

FOREIGN PATENT DOCUMENTS

| WO | WO 01/50322 | 7/2001 |
| WO | WO01/67682 A1 * | 9/2001 |
| WO | WO 03/021483 | 3/2003 |
| WO | WO 2004/102881 | 11/2004 |

OTHER PUBLICATIONS

Davis et al., Role Representation In the E-R Data Model, 1989, IEEE, pp. 1106-1110.*
Eaglestone, Barry & Mick Ridley, *Web Database Systems*, pp. 17-18 & 49-53, 2001.
E.F. Codd, *Extending the Database Relational Model to Capture More Meaning*, ACM Transactions on Database Systems, vol. 4. No. 4, pp. 397-434, Dec. 1979.
Blaha, Michael & William Premariani, *Using UML to Design Database Applications*, 1999.
Date, C.J., *An Introduction to Database Systems*, Addison-Wesley Pub. Co., 1982.

* cited by examiner

*Primary Examiner*—Fred I Ehichioya
(74) *Attorney, Agent, or Firm*—Morgan, Lewis & Bockius LLP

(57) ABSTRACT

An organization asset database (ADb) is described that contains a complete, up-to-date, secure, and easily accessible inventory of the organization's assets. Each asset is mapped onto a structure that represents the organizational hierarchy of the organization, which provides for multiple levels of accountability for each asset. Each asset has one or more roles in relation to other assets in the ADb and has one or more entitlements in relation to other assets in the ADb. The relationship between assets ensures that the ADb is complete and up-to-date and allows for easy filtering and retrieval of the information contained in the ADb.

17 Claims, 24 Drawing Sheets

LEHMAN BROTHERS | LehmanLive®

About This Content | Profile | Contact Us | Terms of Use | Log Off
Policy Report    Keyword  Search

| Home | Fixed Income | Equities | Investment Banking | Private Client Services | Private Equity | EmployeeNet | NewEmployeeNet | Admin | ▽ People Finder | Find |

Hello Ford – 14 Mar 2004

My Pages [My Favorites ▽]
IT Homepage

Create Custom Page with this content
Americas | Europe | Asia

IT Departments
[Choose the IT Department ▽]

Tocket Desktop Applications [$]
App: [-Tocket Applications- ▽]
Mode: ○ Applet  ⊙ Native
[Configure]                    [Launch]

Lehman Performance Management System (LPM)
Establish goals, measure progress, create development plans and conduct performance reviews. Click here or use Keyword LPMIT to learn more and get started.

ITD Online Bonus System
Click here to enter the Online Bonus System
You will need to enter your SecurID username and passcode to access this

1010

Administrative Tasks                                    ⊟ Help

| ☐ | Performance Goals Due<br>Deadline: March 13, 2004<br>⊞ Complete task | You manage one or more employees who have not completed their performance goals. |
| △ | Business Continuity Contact Info<br>Deadline: March 16, 2004<br>⊞ Complete task | You must edit or confirm your emergency contact information. Failure to do so will result in disruption of your LehmanLive service. |
| ☒ | New Employee in P/L Group<br>Deadline: March 19, 2004<br>⊞ Complete task | An employee has joined a P/L Group that you manage, and requires initial processing. |
| ☒ | P/L Group needs T&E Approver<br>Deadline: March 22, 2004<br>⊞ Complete task | You are the administrator of a P/L Group that does not have a manager assigned. |
| ☒ | Department has no manager<br>Deadline: March 25 2004<br>⊞ Complete task | You are the CAO of a division with a department that has no manager assigned. |

Corporate News
"Under the Sign of Excellence"
*Milano Finanza*, a leading Italian publication, recognized Lehman Brothers with the "Best Foreign Merchant Bank" award at its global awards (more)
"Oil Market Reaction to Shell is Muted"
Royal Dutch/Shell Group's restatement of crude-oil reserves has generated a muted reaction in the energy markets. The *Wall Street Journal* reported. But the news, (more)

What's New
John Beyman's Town Hall
The Webcast from Jon Beyman's recent IT Town Hall meetings is now available Click here to view.

devPortal Hot Pick
[NEW] The latest GDF meeting agenda, presentations and meeting summary are now available on devPortal.
☐ Go to devPortal
☐ Send devPortal feedback

Resources
• Enterprise Security Master
• Global Developers Forum
• Lehman TV
• Payroll
• T&E–Submitting Expense Reimbursement Requests
• Web Publishing Guide

Information Technology Links

Career Development
• Functional Job Titles and Descriptions

| | Administrative Tasks | ▸ Help |
|---|---|---|
| ! | Performance Goals Due<br>*Deadline: March 13, 2004*<br>▸ Complete task | You manage one or more employees who have not completed their performance goals. |
| △ | Business Continuity Contact Info<br>*Deadline: March 16, 2004*<br>▸ Complete task | You must edit or confirm your emergency contact information. Failure to do so will result in disruption of your LehmanLive service |
| ✗ | New Employee in P/L Group<br>*Deadline: March 19, 2004*<br>▸ Complete task | An employee has joined a P/L Group that you manage, and requires initial processing. |
| ✗ | P/L Group needs T&E Approver<br>*Deadline: March 22, 2004*<br>▸ Complete task | You are the administrator of a P/L Group that does not have a manager assigned. |
| ✗ | Department has no manager<br>*Deadline: March 25, 2004*<br>▸ Complete task | You are the CAO of a division with a department that has no manager assigned. |

Policy Report: Boston Transportation Survey (Keyword: PolicyReport)

Overview
This report policy subjects by division and departmental P/L group.

| Div | Dept | PL | People | Compliant | % Complete |
|---|---|---|---|---|---|
| ⊞ Business Development Services | 2 | 2 | 2 | 1 | 50% |
| ⊟ Equities | 1 | 8 | 31 | 21 | 68% |
| ⊟ Equities Admin (hidden) | 1 | 8 | 31 | 21 | 68% |
| ⊞ 27299 Boston Sales Tracers | | 1 | 9 | 5 | 56% |
| ⊞ 00360 Equity Sales Boston | | 1 | 10 | 7 | 70% |
| ⊞ 27403 Healthcare Research, Na | | 1 | 1 | 0 | 0% |
| ⊞ 27258 International Sales Boston | | 1 | 4 | 3 | 75% |
| ⊟ 36029 Market Sales Team 3/00 | | 1 | 3 | 3 | 100% |
| Andrew S. Goodman | | | | | 100% |
| Chip H. Leveroni | | | | | 100% |
| Timothy E. Estella | | | | | 100% |
| ⊞ 27413 Other Research, Na | | 1 | 2 | 1 | 100% |
| ⊞ 43465 Program Trading Analytics | | 1 | 1 | 0 | 0% |
| ⊞ 43375 Soft Dollar Ny | | 1 | 2 | 2 | 100% |
| ⊞ Fixed Income | 6 | 9 | 23 | 15 | 65% |
| ⊞ Information Technology | 2 | 3 | 3 | 3 | 100% |
| ⊟ Operations | 1 | 2 | 13 | 5 | 38% |
| ⊞ 24585 Boston Branch | | 2 | 13 | 5 | 38% |
| ⊞ 28871 Boston Branch (pcs) | | 1 | 7 | 1 | 14% |
| ⊞ Branch Operations | | 1 | 4 | 4 | 67% |
| ⊞ Wealth & Asset Management | | 10 | 61 | 41 | 67% |
| Grand Total | 13 | 34 | 133 | 86 | 65% |

Report Filters
Policy: Boston Transportation Survey
☑ Display Non-compliant Mail List?
☑ Display Manager Mail List?

Mailing Lists

Addresses of the non-compliant:
dviering@lehman.com;alan.ianne
n.com;jwhite@lehman.com;bcscash@lehma
man.com;john.montgomery@lehman.c
om;jennifer.bertino@lehman.com;mmo
rtins@lehman.com;gmakrys@lehman.
com;amahmud@lehman.com;jiee2@le
hman.com;asmiller@lehman.com;bradl
ey.waller@lehman.com;swoodruf@le
hman.com;brett.sommerville@lehman.
com;william.olin@lehman.com;thomas Use ctl-A to select all, or ctl-C to copy, then paste into an e-mail address field Managers of the non-compliant:
alan.marantz@lehman.com;alan.ianne
nbaum@lehman.com;cball@lehman.co
m;ctaylor@lehman.com;dporcell@le
hman.com;jkane@lehman.com;jsphizac
@lehman.com;klocher@lehman.com;p
atricia.mangiacapre@lehman.com;rast
ack@lehman.com;rrccior@lehman.co
m;esiper@lehman.com;

Use ctl-A to select all, or ctl-C to copy, then paste into an e-mail address field

FIG. 13

1300 — LehmanLive browser window (Lehman Brothers | LehmanLive)

Address: http://my.lehman.com/LL/lehmanlive

Navigation: Home | Fixed Income Equities Investment Banking Private Client Services Private Equity EmployeeNet Admin People Finder | Find: mybcp About This Content | Profile | Contact Us | Terms of Use | Log Off
Keyword | Search Hello Jillian – 16 Aug 2004

MyBCP (Keyword: MyBCP)

1310 — Contacts
Your Business Continuity Coordinator is:
Patrick A. Alesi | Profile
Vice President
+1 212 526 1734
patrick.alesi@lehman.com
Your division's Business Representative is:
Deidre A. Coreschi | Profile
Assistant Vice President
+1 212 526 7626
dcoreshi@lehman.com

Critical Applications
Below are the tier 1 applications defined for your business. For further details, click the individual application link to access its information in Adb.
- BPSA
- Cameo
- CDB
- CMR
- ESM Pricing
- ESM Product
- FPS
- GSSR USA

Overview
MyBCP was created to quickly provide personalized Business Continuity information related to the employee including recovery location(s), critical applications, emergency conference bridges, and contacts

Message to Employee
For 745 Operations employees, your evacuation assembly location is: 1370
Area #3
UBS Warburg Building
1285 6th Avenue between 51st and 52nd Streets
Click here for a map of this evacuation assembly location.
For NJ employees, your evacuation assembly location is:
Grundy Pier
Click here for a map of this assembly evacuation location.

1320 — Recovery Location
In the event of an incident preventing access to your building, your recovery location is: 1340
70 Hudson, 7th Floor
Click here for a map of your recovery area.

BCP Conference Lines — 1350

1360 — Document Library
- OPS Recovery Documents

BCP Groups
You are a member of the OPS CAO Recovery group.
Click here to update your personal contact information to ensure that you are properly contacted in the event of an incident.

Travel Itinerary
If you will be travelling out of the local area, please keep us informed of your travel itinerary by clicking here.

1380 — Reference
- BCP Home Page
- bcpgroups
- Best Practices and Operating Principles
- FAQ
- Glossary
- Incident Response Plans
- Policies
- Scorecards
- Webcast introducing BCP
- WMD Guide http://my.lehman.com/LLS/PeopleFinderSwitchBoard
Local intranet

FIG.18

LEHMAN BROTHERS | LehmanLive®

These screens are used to set up a BCPGroup. First you provide some basic information about the group, then add the P&Ls assigned to the group, and finally specify for each person whether they are on-call or recovery. If a person is recovery, they must have a primary recovery location assigned.

BCP Group Editor: Equities-Allegretta

| BCP Team Attributes | Available P&Ls | BCP Group Memberships |

BCP Group Name: Equities-Allegretta — 1810

Coordinator: M. Elizabeth Miracky — 1820

Administrator: Alexandra Loria

Description:

Oncall Scenario Code: 1373

Recovery Scenario Code: 1374

— 1850

— 1830

— 1840 Save

LehmanLive - Microsoft Internet Explorer provided by Lehman Brothers

LEHMAN BROTHERS | LehmanLive

These screens are used to set up a BCPGroup. First you provide some basic information about the group, then add the P&Ls assign specify for each person whether they are on-call or recovery. If a person is recovery, they must have a primary recovery location assign BCP Group Editor: Equities-Allegretta

| BCP Team Attributes | Available P&Ls | BCP Group Memberships |

P&Ls in this BCP Team —1910

QA/BA(28367) —1920    delete —1925   1935
                       —1930

Unassigned P&Ls
Corporate Events (29134)                     add
DM CBO Support(43592)                        add
CTAC/OPS(22683)                              add
Direct Market Access (29002)                 add
Neuberger Integration-Eq(43399)              add
ITD(20235)                                   add
P&L Inventory(26191)                         add
Quest(27923)                                 add
IS Financial Services/OB42(44822)            add
Fixed Income Technology(40122)               add
Trades Capture(40124)                        add
GAE Unix Engineering(25387)                  add
Linux Engineering(25479)                     add
GAE Neuberger Integration(27469)             add
GAE Strategy & Architecture(27485)           add
GAE Platform Engineering(27591)              add
GAE Systems Management(27683)                add
GAE Development and Reporting(27695)         add
GAE-Systems Mgmt Engineering (28382)         add
GAE Strategy & Architecture(28383)           add
AGT Migration-Mainframe(40290)               add

SYSTEM AND METHOD FOR CORPORATE-WIDE POLICY MANAGEMENT

BACKGROUND OF THE INVENTION

1. Field of the Invention

The present invention relates to systems and methods for managing the assets of complex organizations. More specifically, the invention relates to systems and methods for managing and enforcing corporate-wide policies.

2. Description of the Related Art

Small organizations are information efficient in that all information can be shared directly with everyone in the organization such that each person knows what the other is doing. As organizations grow in size, internal communications networks, such as an intranet for example, facilitates communication between geographically distinct locations that range from communication between offices within a building to communication between offices located in different continents. The use of intranets and the supporting hardware and software are well known and need not be described further. For example, C. Zacker, "Networking: The Complete Reference," McGraw-Hill Companies, Berkeley, Calif. (2001), incorporated herein by reference, describes network hardware and protocols that may be used in an intranet. In another example, R. Orfali, D. Harkey, "Client/Server Programming with Java and COBRA, $2^{nd}$ ed.," John Wiley & Sons, Inc., New York (1998), incorporated herein by reference, describes software methods that may be used to develop client/server middleware. Other traditional methods such as, for example, remote procedure calls (RPC), Message-Oriented-Middleware (MOM), or database stored procedures may be used to develop client/server middleware.

As organizations grow, they also become structurally complex and information flow becomes balkanized as each division within the organization generates and maintains information necessary for its operation. In many situations, separate customized databases are maintained by each division to store the information necessary for that division. When a person requires information from another division, they usually must be granted permission to access the other division's database and the data retrieved may be stale. The necessity of obtaining permissions for each separate division makes the generation of organization-wide reports difficult and time-consuming.

Large corporations are also subject to state, federal, and international laws that require corporate-wide compliance. In order to comply with such requirements, information must be gathered across every division within the corporation in a timely manner. Therefore, there remains a need for systems and methods where corporate-wide policies can be implemented and monitored in a timely manner over the entire organization. There also remains a need for systems and methods that allows transparent access to the organization's assets with procedures that ensure data reliability and cost effective data collection campaigns.

SUMMARY OF THE INVENTION

An organization asset database (ADb) is described that contains a complete, up-to-date, secure, and easily accessible inventory of the organization's inventory of assets. Each asset is mapped onto a structure that represents the organizational hierarchy of the organization, which provides for multiple levels of accountability for each asset. Each asset has one or more roles in relation to other assets in the ADb and has one or more entitlements in relation to other assets in the ADb. The relationship between assets ensures that the ADb is complete and up-to-date and allows for easy filtering and retrieval of the information contained in the ADb.

One embodiment of the present invention is directed to an asset database system comprising: an asset table comprising at least one asset record representing an asset, the at least one asset record characterized by an asset type; and a relationship type table comprising at least one record representing a relation between a first asset type and a second asset type, wherein one or more asset record is each mapped to an administrative unit asset through a relation defined in the relationship type table, the administrative unit asset representing an administrative unit in an hierarchically structured organization.

Another embodiment of the present invention is directed to a computer implemented method for maintaining data integrity of an asset database comprising the steps of: providing an asset database comprising an asset table including at least one asset record representing an asset, the at least one asset record characterized by an asset type, and a relationship type table comprising at least one record representing a relation between a first asset type and a second asset type, wherein one or more asset record is each mapped to an administrative unit asset through a relation defined in the relationship type table, the administrative unit asset representing an administrative unit in an hierarchically structured organization; updating the asset database from a data feed from an authoritative data source; identifying a change in an inventory of the asset database; determining if additional information is required by the change in inventory; identifying a person responsible for providing the additional information based on the person's relationship to the changed inventory; receiving the additional information from the person; and updating the asset database with the additional information.

BRIEF DESCRIPTION OF THE DRAWINGS

The invention will be described by reference to the preferred and alternative embodiments thereof in conjunction with the drawings in which:

FIG. 10a is an illustration of a homepage displaying an administrative nugget in some embodiments of the present invention;

FIG. 10b shows a detail of the administrative nugget shown in FIG. 10a;

FIG. 11 is an illustration of a compliance report used in some embodiments of the present invention;

FIG. 13 is an illustration displaying portions of a BC plan relevant to an employee in some embodiments of the present invention'

FIG. 18 is an illustration displaying a view of a BCP Group editor in some embodiments of the present invention;

FIG. 19 is an illustration displaying an available P&Ls view of the BCP editor in some embodiments of the present invention;

FIG. 20 is an illustration displaying a group memberships view of the BCP editor in some embodiments of the present invention;

DETAILED DESCRIPTION

Figure 1:
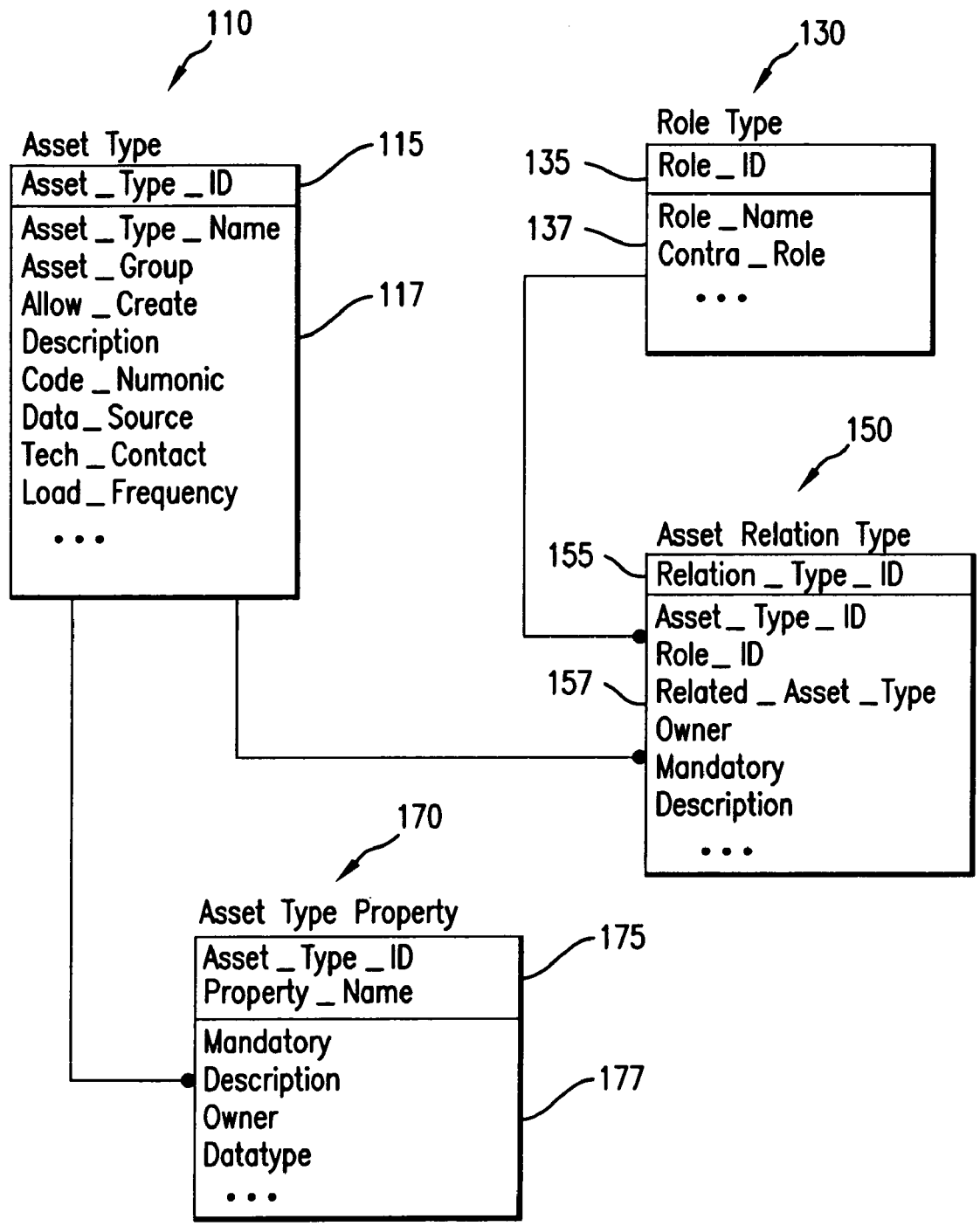
FIG. 1 is a diagram illustrating a data model in one embodiment of the present invention.

A corporate-wide, or enterprise-wide, policy may be implemented, documented, and its' compliance measured by encoding policies into an asset database (ADb). ADb is a relational database that reflects the assets of the Firm, and how those assets interrelate. Assets include employees, hardware, software, content, and the like. Assets also include suborganizations of the firm such as, for example, divisions, departments, and P&L groups. ADb relates each asset to the Firm's organizational hierarchy such that the hierarchy of people controlling the asset is easily identified.

The ADb system incorporates a structure that maps the organization into Divisions, Departments, and Business Areas that mirrors the actual organization of the corporation. Furthermore, asset relation types are incorporated into ADb that relate an asset to an administrative function (e.g. CAO), geographic location (e.g. region, country, city, building, desk), legality (e.g. payroll, compliance), title within the firm (e.g. Managing Director, Senior Analyst, VP), role within/relationship to the firm (e.g. committee member, vendor, client), or P&L group.

This structure empowers the user with a common semantic base to facilitate the assignment and maintenance of assets, along with the flexibility to sort, filter, or group segments of the Firm with relative ease. The benefits of this alone are many, but chief among them are a clear blueprint of the Firm's architecture and an organized system driven and defined by entitlements ADb, in addition to serving as an inventory of physical and virtual assets, defines organizational standards to the extent that asset ownership and access are based on entitlements. This accountability allows for greater transparency and data control at the enterprise level and provides easier application integration, greater synchronization of data, lower cost of document storage, improved navigation and search, better control over operational risk, more accountability for data administration, and reduced redundancy of tasks/data.

ADb may be accessible to all employees within the organization through the organization's intranet and may be leveraged by every department. Users can rely on the completeness and accuracy of the data in ADb and can access the data through a common vocabulary. ADb keeps its data current by receiving data feeds from various authoritative data sources throughout the organization. Each authoritative data source is responsible for the accuracy of its data feed. Usually, the authoritative data source gathers the information for its own purposes and therefore has a built-in incentive to maintain the accuracy of its data feed. For example, human resources (HR) has an incentive to maintain an accurate and current list of all employees in the organization because it needs such a list to perform its functions. At the same time, HR may be reluctant to allow to other departments in the organization to access to its list or it may use a custom application to maintain the list that would require a custom interface. By loading the employee list from HR into ADb, everyone in the organization has access to a current and accurate list of employees without building a custom interface to the HR application while maintaining the integrity of the HR data. In this example, HR is the authoritative data source for the person inventory in ADb.

Whenever ADb receives a new data feed from an authoritative data source, ADb compares the current inventory to the new inventory and generates exceptions that flag changes to the inventory. These changes may be automatically distributed to individuals or groups that need to know of such changes. ADb automatically generates email lists for change notifications based on roles and the relationship between the data feed and the roles of the people being notified.

Changes can also create a situation where an asset is orphaned and ADb can identify and remedy such situations. As an illustrative example, if a person who manages an application leaves the organization, ADb generates an exception at the next data feed from HR. ADb also identifies the application that is now orphaned and notifies the person who accounts for the application that a new manager for the application must be appointed. ADb can retrieve the identity of the person who accounts for the application by filtering on the application and the relationship type Accounts_For. ADb may add a reminder to the person's web page to appoint a manager for the application. If the person does not appoint a manager within a predetermined period, ADb may restrict use of the person's network privileges and notify that person's manager of the incomplete task. In this fashion, inconsistencies in the ADb are quickly remedied by the proper escalation to the next higher authority in the chain of command. The roles and relationships that tie an asset to the organization's hierarchy ensure the proper chain of accountability for each asset.

ADb includes an entitlement system that allows administrators and managers to assign access privileges based on an employee's role within the organization. The entitlement system may incorporate compliance and security measures that are automatically instantiated based on specific assigned criteria, such as for example, administrative function, geographic location, legality, title, P&L, or role within/relationship to the firm. The transparency of ADb facilitates audits at the departmental, divisional, and global levels.

As an illustrative example of the entitlement system incorporated into ADb, an employee having a title of VP, acts as CAO of a department, works in the San Francisco office, and serves on the Global Executive Steering Committee will be associated with various lists and entitlements according to his role. As a VP, for example, the employee may have authority to access certain privileged company information. The CAO role may allow the employee different entitlements such as viewing/altering budget data for the department. The employee may receive email alerts regarding issues, which affect the San Francisco office, and may have membership to the committee's online forum. Entitlements may be assigned upon hiring, promotion, or change in status and/or role. Entitlements also identify employees that are allowed to assign or change an asset's entitlements.

Entitlements may also be used to manage the organization's documents more efficiently. Electronic documents are often stored on the employees' personal network drives and are typically emailed to entitled parties who are interested in viewing them. Some documents are copied to shared areas where they can be accessed by people in the same team or department. Alternatively, a Virtual Room may be created to house discussion threads and document libraries. Virtual rooms, however, must be maintained by an administrator.

ADb can broaden these document management functions by expanding the kinds of relationships assigned to each asset. ADb may provide named stores for documents reflecting a variety of relationships, and set entitlements for those stores based on roles within the Firm. As an illustrative example, an auditor for a division may be able to access all documents pertaining to an audit policy in that division. Similarly, a department manager may access all performance reviews in that department or members of a cost initiative team may open documents related to that initiative.

When an employee assumes a new role, entitlements for all document stores are automatically updated, along with any other tools identified with that role by ADb to reflect the new role of the employee. The automatic entitlements update results in fewer documents being emailed and shared redundantly while providing savings in redundant storage costs. The automatic update reduces the workload of server administrators plagued with the constant authorizing and unauthorizing of folder access. Inefficiencies in trying to locate needed documents are reduced, as are the risks associated with exposing documents to unauthorized individuals.

The organization typically mandates policies, which affect employees in their various roles. Policy authorities implement policies and range from Compliance, Audit, and Human Resources to the less obvious, such as Business Continuity and Security Engineering, which dictate requirements for applications and developers. There are also data policies in place that require all employees to have a manager listed in the database, and all Applications to have a technical manager.

Each policy may be enforced on a case-by-case basis. Some policies may require documents to be distributed, completed, and collected. Others, while clear and well communicated, lack a mechanism to ensure compliance. In the past, it has been difficult for an employee responsible for complying with a given policy to determine whether he/she meets its requirements.

ADb provides a centralized policy management framework, whereby policy authorities set definitions to identify people or assets that do not comply with a given policy. The system can identify the person responsible for resolving the issue, and who in the organization, presumably a manager or administrator, should be provided with summary reports.

The delivery mechanism for policy enforcement is typically the organization's intranet. When an employee launches a browser, a page is displayed containing a nugget listing policy requirements that must be resolved by the employee, including timeframes and consequences for failure to comply. Consequences may include revocation of a privilege or escalation to someone higher up in the management hierarchy.

As an illustrative example, suppose Business Continuity sets a policy requiring all employees to update or affirm their contact information every three months. If the last update for an employee exceeds six months, ADb generates an exception condition. This sends a notification to that employee's manager, while the division managers and BCP heads are provided with summary reports. ADb may also be configured such that the employee is denied access to online content until such issues are resolved.

ADb can provide up-to-date reporting of exception conditions grouped by department, building, or any other parameter available in the database because the interconnections between policies, exceptions, and policy authorities are maintained by ADb.

Metrics may be created to measure the effectiveness of a given policy. Some policies may require that its metric simply track assets in the organization's inventory and report change over time. Other policies may require a count of policy exceptions and report change over time.

Metrics should be transparent, current, and complete in scope. The global taxonomy and standardization of data parameters provided by ADb allows for transparent data mining of the assets contained in ADb and facilitates the calculation of these metrics. The calculated metrics are as current and complete as ADb.

FIG. 1 is a diagram illustrating a data model in some embodiments of the present invention. In FIG. 1, four data types are shown as tables that characterize each asset within an organization or corporation.

An asset type table 110 defines each asset type within the ADb. Each record in the asset type table 110 contains a primary key 115 and a plurality of fields 117 that define each asset type. In the example shown in FIG. 1, the primary key 115 is labeled Asset_Type_ID and is unique for each asset type. Asset_Type_Name is a name assigned to each asset type. Asset_Group is a name that refers to a collection of asset types for easier management. Allow_Create is a flag indicating whether inventory of that asset type is created manually or automatically. Description is a short description of the asset type. Code_Numonic is a short alpha code prefix for that asset type. For example, "div" may be the code mnemonic for the division asset type. Data_Source indicates the source of the inventory, or asset. Tech_Contact indicates the owner of the feed of the inventory. Load_Frequency indicates the frequency of updates of that feed to the ADb. It should be understood that other fields may be included in the asset type table and are intended to be within the scope of the present invention. For example, the asset type table 110 may include a field containing a default URL that points to an HTML document used to display asset information having that asset type.

A role type table 130 defines each role type that may be assigned to an asset within the ADb. A primary key 135, labeled Role_ID in FIG. 1, provides a unique identification of each role type. A plurality of fields 137 define each role type and may include a Role_Name, which is a short description of the role. A Contra-Role may also be included in the role type table 130 to indicate the inverse role. For example, a role type named "Manages" would have a contra-role named "Managed by" and visa versa. A role links two asset types via an asset relation type.

An asset relation type table 150 defines each relation type that defines the permitted relations between asset types within the ADb. The asset relation type table 150 includes a primary key 155 that provides a unique identifier for the relation type.

The asset relation type table 150 also includes a plurality of fields 157 that define the relation type. The asset relation type table 150 includes an Asset_Type_ID, a Role_ID, and a Related_Asset_Type that define the relation between two asset types. Both Asset_Type_ID and Related_Asset_Type describe an asset type defined in the asset type table 110. The Role_ID describe a role type defined in the role type table 130. The asset relation type table 150 may also include an Owner field that describes the originator or the person who requested the creation of the relation type. A Mandatory field contains a flag indicating whether nulls are permitted. A Description field may include a short description of the asset relation type.

An asset type property table 170 defines a property of an asset type and includes a primary key 175 that provides a unique identifier for the property type. In the example shown in FIG. 1, the primary key 175 comprises an Asset_Type_ID that describes an asset type and a Property_Name that describes an asset property. The pairing of the Asset_Type_ID and Property_Name in the primary key field 175 provides the unique identifier for the property type. The asset type property table 170 also includes a plurality of fields 177 describing the asset property. A Mandatory field may be included that indicates whether Nulls are permitted. A Description field may contain a short description of the asset property. An owner field may indicate the owner of the asset type property.

Each of the tables 110, 130, 150, and 170 shown in FIG. 1 may include additional fields to enhance performance, to provide audit tracking, or overall robustness of the ADb and are understood to be within the scope of the present invention. The four tables shown in FIG. 1 form an exemplar data model that characterizes each asset in the ADb. In addition to describing each asset, each asset may be mapped onto a hierarchical structure, preferably one that reflects the internal structure of the organization.

Figure 2:
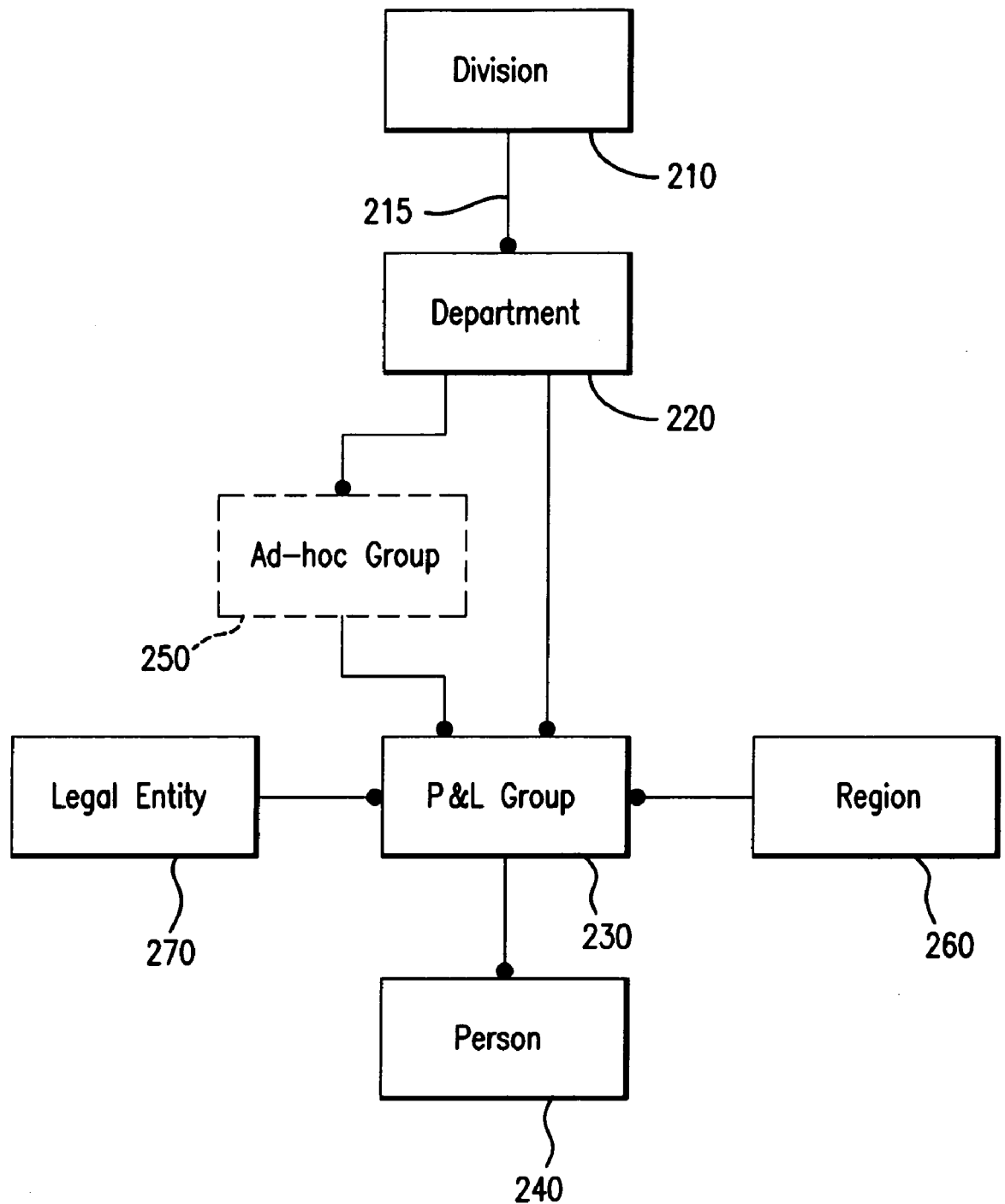
FIG. 2 is a diagram illustrating a hierarchical structure that may be used in some embodiments of the present invention.

FIG. 2 is a diagram illustrating a hierarchical structure that may be used in some embodiments of the present invention. In the exemplar organizational structure shown in FIG. 2, a Division 210 represents a top-level administrative unit of the organizational hierarchy. The organization may have one or more divisions. A Department 220 represents a second level administrative unit of the organizational structure. A Department may represent a region or a business unit and preferably reflects the structure of the organization. A line 215 with a dotted end connecting the Division 210 to the Department 220 indicates a many-to-one relationship between the Division 210 and Department 220. In FIG. 2, the dotted end at the Department 220 indicates that a Division 210 contains at least one Department 220. Another way of describing the relation between the Division 210 and Department 220 is that a Division Consists Of Departments. Conversely, a Department Belongs To a Division. In the structure shown in FIG. 2, "Consists Of" is a role that relates a Division to a Department. Similarly, "Belongs To" is a role that relates a Department to a Division. The role, "Belongs To", is the contra-role to "Consists Of" and visa versa.

Below the Department in the organizational hierarchy shown in FIG. 2 is the P&L Group 230 administrative unit. In a preferred embodiment, the P&L Group represents a budgeting unit in the financial structure of the organization. A P&L Group 230 Belongs To a Department in a many-to-one relationship. Conversely, a Department Consists Of P&L Groups. The P&L Group also Belongs To a Division and a Division Consists Of P&L Groups because of the transitive property of roles.

The foundation of the organizational hierarchy is a Person 240. A Person Belongs To a P&L Group and must therefore belong to a Department 220 and a Division 210. In a preferred embodiment, a Person 240 directly belongs to only one P&L Group 230.

An optional Ad-hoc Group 250 may be included in the organizational hierarchy to allow for alternative organizational levels within the hierarchy such as, for example, a business area.

A Legal Entity 270 Consists Of P&L Groups 230. A legal entity is a legally registered company linked in some way to the organization. In a preferred embodiment, a Legal Entity 270 is taken from the organization's general ledger.

Figure 3:
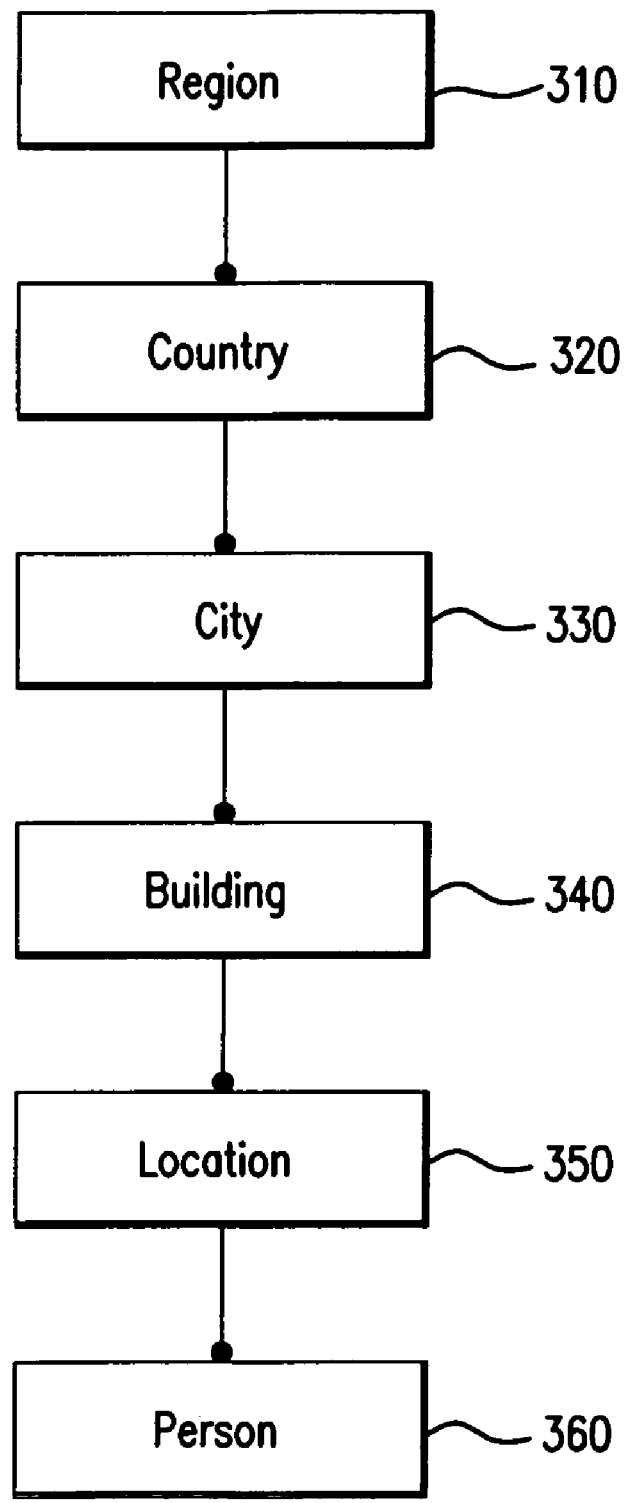
FIG. 3 is a diagram illustrating a geographic hierarchy used in some embodiments of the present invention.

The organizational hierarchy may also include a geographic hierarchy. FIG. 2, for example, indicates that each P&L group Belongs To a Region 260. In some embodiments, a geographic hierarchy may be used to attach a location to an asset. FIG. 3 is a diagram illustrating a geographic hierarchy used in some embodiments of the present invention. In FIG. 3, the top-level geographic entity is a Region 310, which consists of at least one Country 320. Each Country 320 consists of at least one City 330 and each City 330 consists of at least one Building 340. Each Building 340 consists of at least one Location 350 and each Location consists of at least one Person 360.

Once the meta-data and mapping structure are defined, the ADb may be implemented by creating the asset types, property types, roles, and relationship types that describe the assets and organizational structure. Table 1 below shows the asset types that describe the organizational structure shown in FIGS. 2 and 3.

TABLE 1

| Asset_Type ID | Asset Type Name | Asset Group ID | Allow Create? | Code Name | Data Source | Load Frequency |
|---|---|---|---|---|---|---|
| DIVISION | Division | ORG | N | div | Finance | |
| DEPARTMENT | Department | ORG | N | dep | Finance | |
| PLGROUP | P&L Group | ORG | N | plg | HR | daily |
| PERSON | Person | ORG | N | per | HR | daily |
| LEGAL_ENTITY | Legal Entity | ORG | N | lle | Finance | daily |
| REGION | Region | ORG | N | reg | Org | |
| COUNTRY | Country | ORG | N | try | Org | |
| CITY | City | ORG | N | cty | Org | |
| BUILDING | Building | ORG | N | bdg | Org | |
| LOCATION | Location | ORG | N | loc | Org | |

The asset types shown in Table 1 have the Allow_Create flag set to disallow manual creation of assets having the asset types shown in Table 1. This is done to prevent ad-hoc creation of these asset types because they represent the structure of the organization.

The entries in the Data Source column identify the authoritative source for creating assets of the asset types shown in Table 1. In Table 1, Human Resources (HR) is the authoritative source for creating a Person or a P&L Group asset. HR is assumed to be the authoritative source for all Person assets because HR must keep accurate, up-to-date, and comprehensive lists of all organization employees in order to perform their assigned functions. HR has the motivation and incentive to expend their resources to maintain a complete and current list of all employees because they need that information to complete their other assigned tasks. HR also has the incentive to prevent access to the list to reduce the risk of corruption to the list. Other groups seeking access to a complete list of employees in the organization must be granted permission from HR to access the list and they must learn the specific database management system used by HR to access the employee list, which may be different from the DBMS used by the requesting department.

One of the advantages of the present invention is a global taxonomy that all groups within the organization use to access information through the ADb. Furthermore, by updating inventory feeds from authoritative sources such as HR, for example, users of the ADb can rely on the accuracy, timeliness, and completeness of the information without expending their own resources to create their own list of employees, for example. Updating inventory feeds to ADb also reduces the risk of data corruption of the authoritative source list because the information is supplied to the rest of the organization through ADb and not directly from the authoritative source list.

Finance may also maintain a complete and current list of employees and could also act as the authoritative data source for the Person assets. Selection of the authoritative data source may depend on factors such as ease of updating or responsiveness such as, for example, where HR is expected to be notified of the change before Finance. In either case, both HR and Finance are authoritative data sources for the Person inventory because both departments have the incentive to keep accurate and current lists of the employees.

The load frequency of the authoritative data source is indicated in the last column of Table 1. Table 1 shows that the Person and P&L Group inventory are updated daily from the HR data source. In contrast, the City, Country, and Building inventory are not updated at a regular frequency because these assets are not expected to change as frequently as the Person or P&L Group inventory.

Table 2 is a partial list of asset property types for the asset type Person. The list in Table 2 is not exhaustive but illustrates the type of properties that may be used to describe a Person asset. As Table 2 illustrates, each Person asset may include properties that describe a person's name, job title, email address, email host, telephone number, employee status, the sub network of the person's computer, and the person's business unit. Each property type also indicates whether the property is required and the data type (string, number, flag, etc.) of that property.

TABLE 2

| Asset_Type ID | Property Name | Mand. | Data Type |
| --- | --- | --- | --- |
| PERSON | FIRST_NAME | N | String |
| PERSON | LAST_NAME | N | String |
| PERSON | JOB_TITLE | N | String |
| PERSON | EMAIL | N | String |
| PERSON | EMAIL_HOST | N | String |
| PERSON | PHONE_NUMBER | N | String |
| PERSON | EMPLOYEE_STATUS | Y | String |
| PERSON | NT_DOMAIN | N | String |
| PERSON | BUS_UNIT | N | String |

Table 3 is a partial list of roles and its contra-role that may be used in some embodiments of the present invention. The list in Table 3 is not exhaustive but illustrates the type of roles that may be used to define relationship types.

TABLE 3

| Role_ID | Role Name | Contra Role | Contra Name |
| --- | --- | --- | --- |
| ACCOUNTS_FOR | Accounts For | ACCOUNTED FOR BY | Accounted for by |
| ADMINISTERS | Administers | ADMINISTERED_BY | Administered By |
| BELONGS_TO | Belongs To | CONSISTS_OF | Consists Of |
| FINANCE_REP | Finance Rep | FINANCE REP FOR | Finance rep for |
| MANAGES | Manages | MANAGED BY | Managed by |
| OWNS | Owns | OWNED BY | Owned by |
| SUBSCRIBES_TO | Subscribes to | SUBSCRIBED BY | Subscribed by |
| TECH_OWNER | Technology Owner | TECH OWNER FOR | Tech Owner for |
| USES | Uses | USED BY | Used by |

Table 4 is a partial list of relationship type that may be used to connect one asset type with another asset type. The first three entries in Table 4 define the relationship type that maps assets onto the organizational structure shown in FIG. 2 wherein a division consists of at least one department, a department consists of a P&L group, and a P&L group consists of a person. The fourth entry in Table 4 illustrates the use of a contra-role to define an inverse relationship, which in this instance defines a relationship requiring (as indicated by the mandatory flag) that a person belong to a P&L group. The fifth through seventh entries in Table 4 illustrate the various parallel roles asset types may have with another asset type. In the example shown in Table 4, a person may manage, account for, or own a P&L group. In the manage role, the person may be responsible for protecting the P&L group asset type by approving or making changes to specific properties or relationships for that asset type. In some embodiments, some properties and relationships may be restricted such that only specified people may makes those changes and the owner or manager of an asset may be allowed to change the other properties and relationships of the asset type. In the "accounts for" role, the person may be the backup person that accounts for the P&L group asset. In the "owns" role, the person may be the financial owner of the P&L group. The last entry in Table 4 illustrates a relationship type that allows a person to be notified when a change in an application is made.

TABLE 4

| Asset_Type_ID | Role_ID | Related_Asset_Type | Mandatory |
|---|---|---|---|
| DIVISION | CONSISTS OF | DEPARTMENT | Y |
| DEPARTMENT | CONSISTS OF | PLGROUP | N |
| PLGROUP | CONSISTS OF | PERSON | N |
| PERSON | BELONGS TO | PLGROUP | Y |
| PERSON | MANAGES | PLGROUP | N |
| PERSON | ACCOUNTS_FOR | PLGROUP | N |
| PERSON | OWNS | PLGROUP | N |
| PERSON | SUBSCRIBES_TO | APPINSTANCE | N |

It should be understood that the entries in Tables 1-4 are not exhaustive and other asset types, roles, properties, and relationship types may be created by adding an entry into the appropriate table. The asset types, roles, properties, and relationship types define an organization-wide common language to describe any asset within the organization and provides transparent access to accurate and current information about organization assets.

Figure 4:
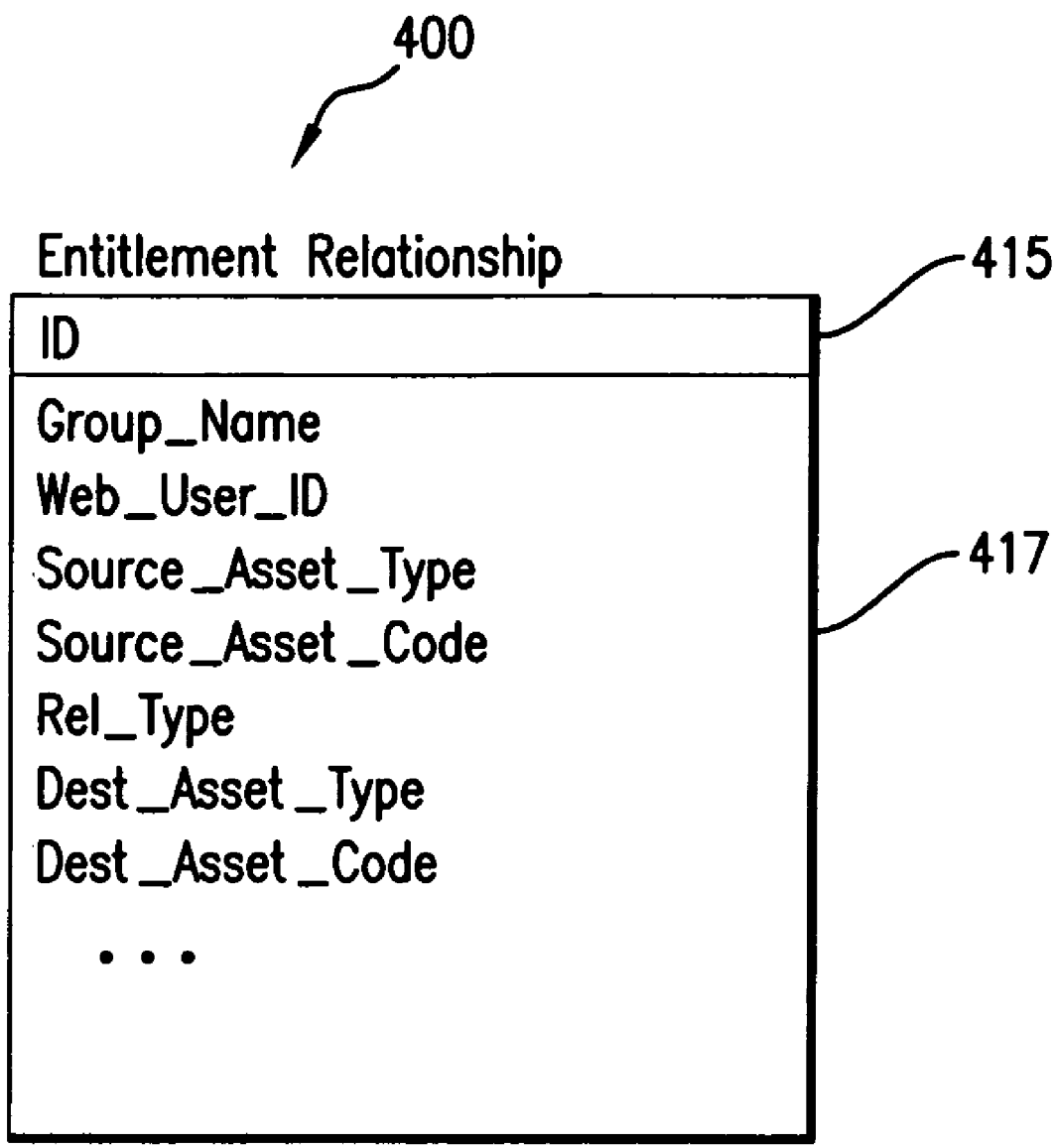
FIG. 4 is a diagram illustrating an entitlement relationship table used in some embodiments of the present invention.

A hierarchical system of entitlements may be implemented in ADb by defining the individuals or groups of individuals entitled to create, delete, or modify asset types, roles, properties, and relationship types. In some embodiments, the entitlement system may be defined by an entitlement relationship table such as the one shown in FIG. 4. In FIG. 4, an entitlement relationship table 400 includes a primary key 415 and at least one field 417 describing the entitlement. In FIG. 4, Group_Name identifies a group of individuals that hold the entitlement. A Group_Name may include, for example, all Chief Administrative Officers (CAO) or all application managers in a particular department. A Web_User_ID identifies a particular individual holding the entitlement. An entitlement may allow an individual or group of individuals to modify a specifically identified asset or a group of assets. Source_Asset_Type identifies an Asset_Type and Source_Asset_Code identifies a specific asset. Rel_Type identifies the relation between the source and destination asset. Dest_Asset_Type identifies an Asset_Type and Dest_Asset_Code identifies a specific destination asset.

Figure 5:
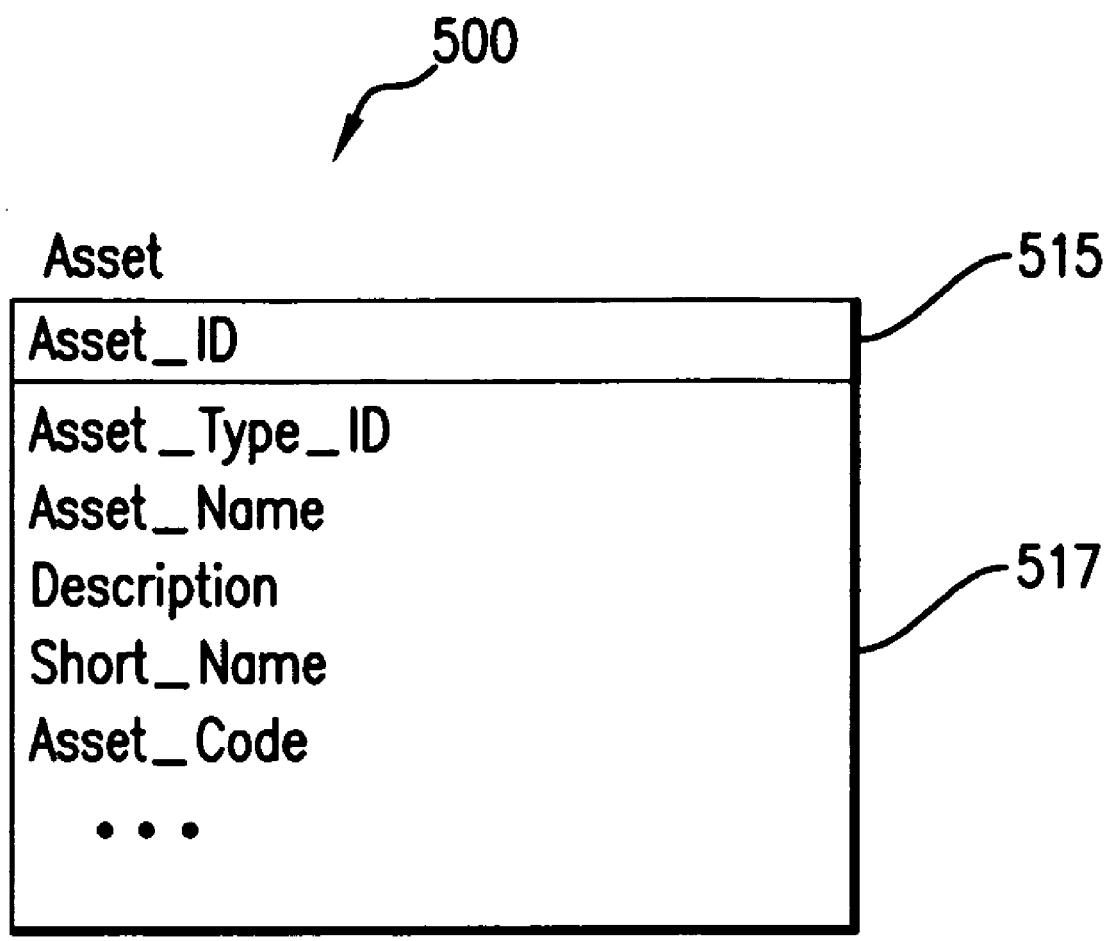
FIG. 5 is a diagram illustrating an asset table used in some embodiments of the present invention.

Once the data model and organization structure are defined, the ADb can receive the organization's inventory of assets. Each asset is entered into ADb via an entry in an asset table. FIG. 5 is a diagram illustrating an Asset table in some embodiments of the present invention. In FIG. 5, an asset table 500 includes a primary key 515 and at least one field 517 describing the asset. An Asset_ID is a primary key 515 that provides a unique identifier for the asset in the ADB. Asset_Type_ID describes the asset type of the asset and is selected from one of the asset types in the asset type table. Asset_Name is the name assigned to the asset and Description is a short description of the asset.. Short_Name is a name that is unique across the entire universe of that asset type. Asset_Code is a unique identifier for the asset that is exposed to other applications. Each asset may have zero or more properties associated with the specific asset and stored as property-value pairs. Similarly, each asset may have zero or more relationships to other assets.

Figure 6:
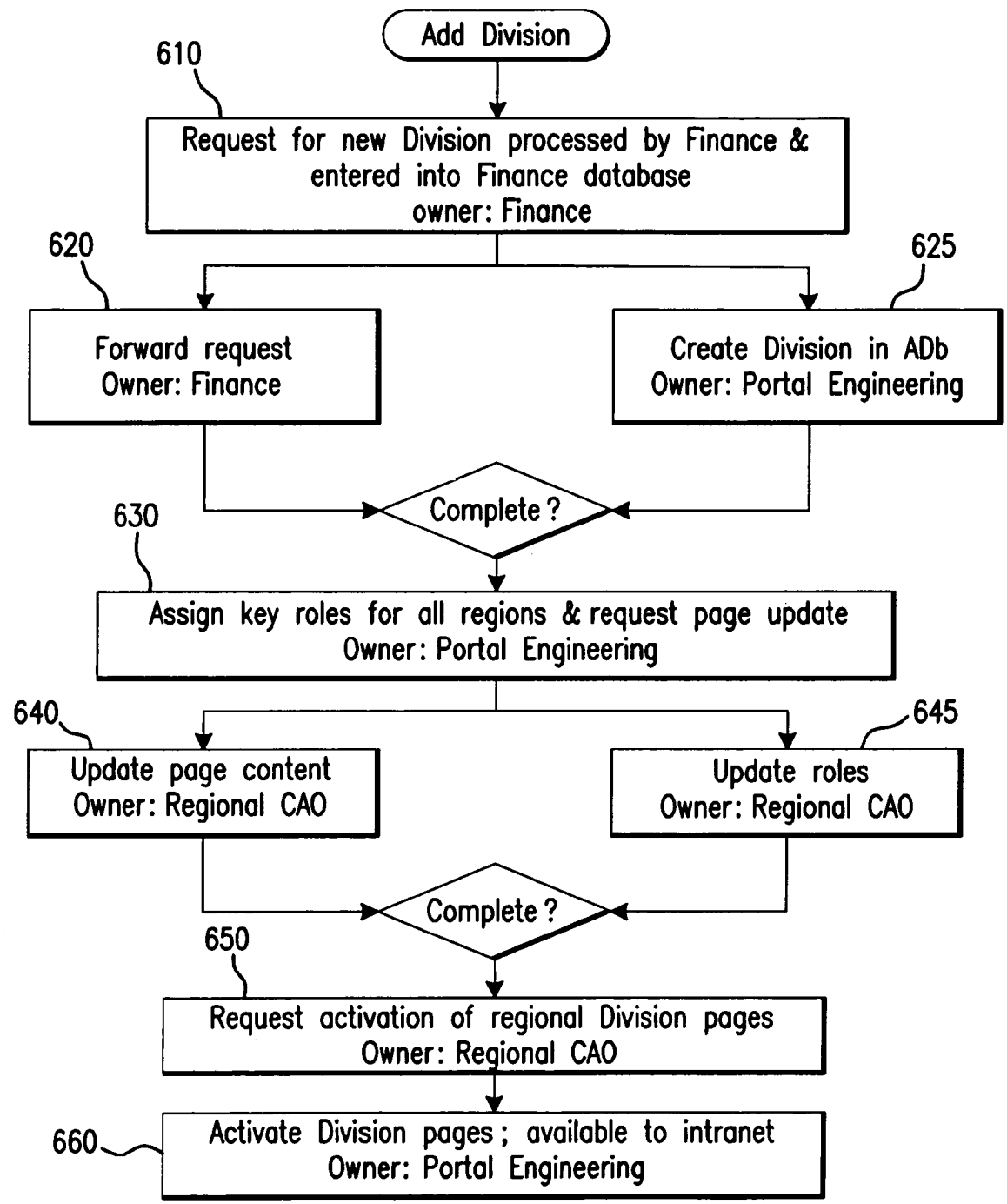
FIG. 6 is a flow diagram illustrating the creation of a Division inventory in an embodiment of the present invention.

FIG. 6 is a flow diagram illustrating the creation of a Division inventory in the Adb. A request for a new Division is received and processed by Finance and entered into its databases in step 610. A copy of the request is forwarded to portal engineering in step 620 and preferably including the requestor name, a user-friendly name, and key roles for each region. Key roles may be Manager, CAO, Finance Reps, and administrators. The addition of a new Division into the Finance database causes an exception report to portal engineering in step 625. In the example shown in FIG. 6, the authoritative data source for the Division asset is Finance. When ADb updates from the authoritative data sources, such as Finance for Division assets, the new Division in the Finance database causes an exception because the new Division is not in ADb. After notification, portal engineering, as the owner of the Division asset type, creates the Division asset in ADb but sets the asset to inactive status so that it does not appear on the organization's intranet. After steps 620 and 625 are complete, portal engineering assigns the key roles provided by Finance for all regions in step 630. Portal engineering also sends a request to all regional CAOs and administrators to update their regional page content and roles. The role of regional CAO entitles the person to update the page contents of that region and may allow the regional CAO to give the same entitlement to one or more administrators for that region. In response, the regional CAOs or administrators within the target region update the regional Division page and update the remaining roles in the Division in steps 640 and 645, respectively. When both steps 640 and 645 are complete, the regional CAO in step 650 sends a request to portal engineering to activate the regional Division intranet pages. In step 660, portal engineering activates the Division pages to allow access to the pages from within the organization's intranet.

Figure 7:
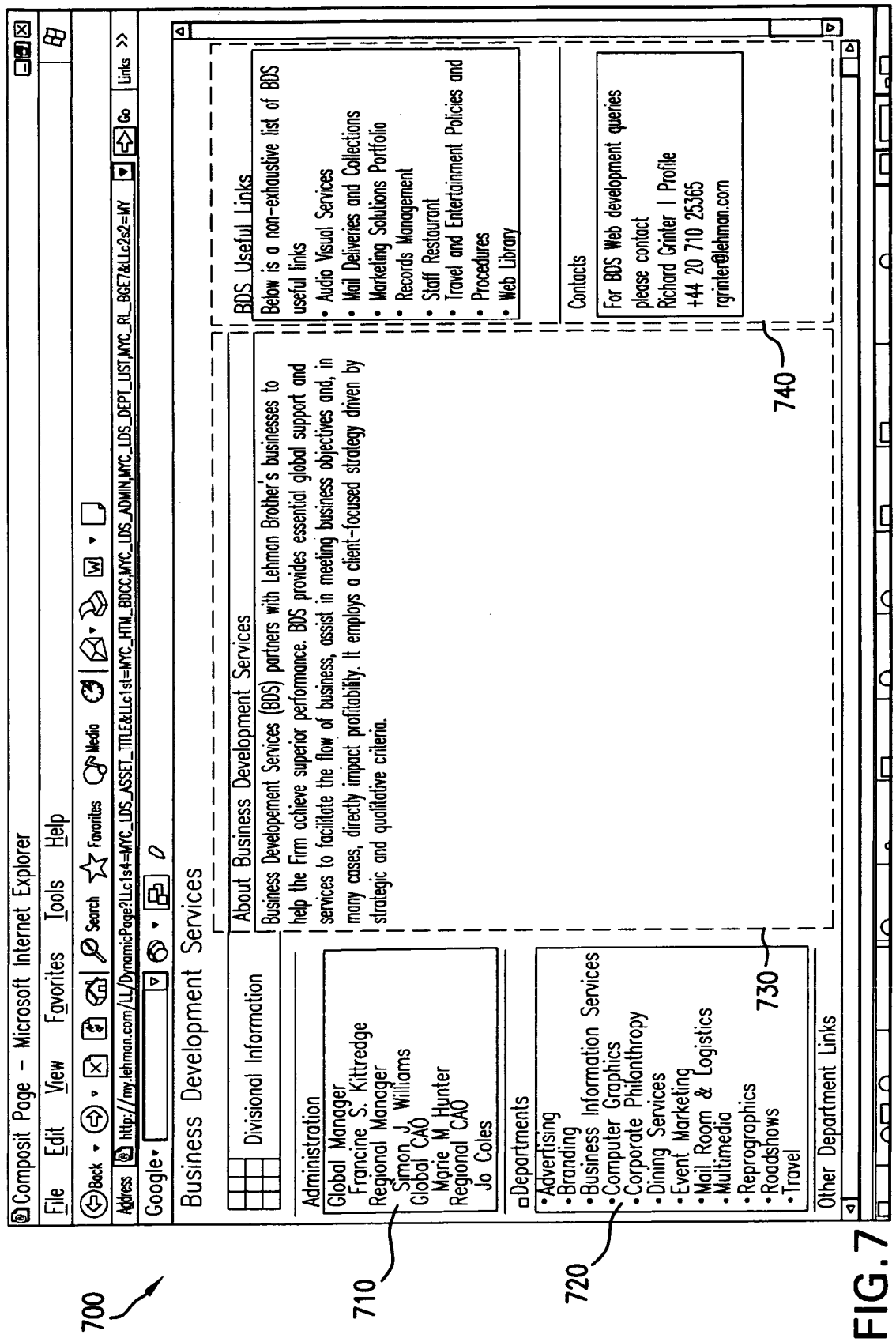
FIG. 7 is an illustration of a regional Division page in an embodiment of the present invention.

FIG. 7 is an illustration of a regional Division page in an embodiment of the present invention. The regional Division page 700 may be stored as an HTML page. The regional Division page 700 includes a display of an administrative nugget 710 that displays a regional view of the key role members of that Division. The regional view to be displayed may be determined by filtering through a chain of relationships that link a person to a workstation, a person to a P&L Group, and a P&L Group to a region. The key role members are determined by filtering the management roles to show only the target regional manager. A departments nugget 720 displays a regional view of the related departments for the Division. The regional view of the departments list may be determined by filtering against the associated P&L Groups that are related to the targeted region. The middle nugget 730 and right nugget 740 display Division/Region specific content for the organization. The Division owners create and own the content displayed in the middle and right nuggets.

Assets may be created manually or from data feeds from authoritative data sources. The authoritative data sources may be any group that maintains and is responsible for a group of assets. For example, a real estate group may be responsible for maintaining a list of properties occupied by the organization or a network infrastructure group may be responsible for the hardware on the network. Each group may use a specialized application to maintain their assets. A data feed containing the asset information of each group is sent to ADb at periodic intervals or on demand depending on the dynamic nature of the data. For example, all employees may be entered from an automated data feed from HR on a daily basis because employees are hired or leave on any given day. On the other hand, the real estate group may provide a data feed only on demand because changes in building leases occur infrequently. The data feed may be a simple report generated on the group's application in a format known to ADb such as comma separated variables (CSV), for example.

ADb is easily scalable and new data feeds may be created to accommodate new groups. For example, a business continuity planning (BCP) group may leverage the information already in ADb and makes its information available to the organization by creating a data feed containing the BCP assets. The BCP assets are characterized by asset types, roles, and relationships that may be created to support the BCP assets.

Figure 8:
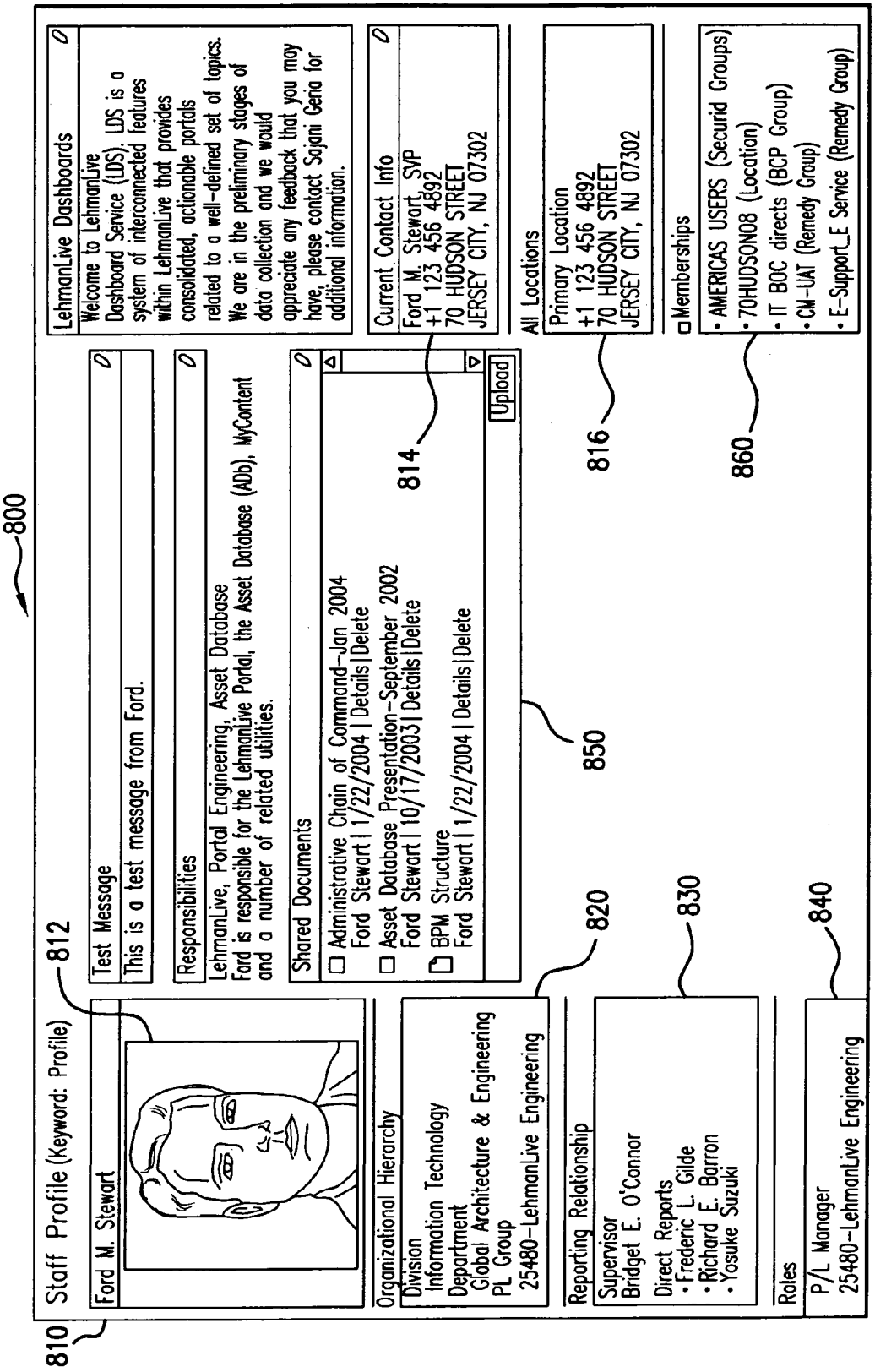
FIG. 8 is an illustration of a dashboard displaying enhanced directory information in some embodiments of the present invention.

The roles and relationships that are stored in ADb may be used to enhance and leverage the information in ADb. For example, FIG. 8 is a webpage, or dashboard, illustrating useful enhancements to a directory application that leverages existing data in ADb. FIG. 8 presents an employee profile as a results page in an organization's People Finder application. The dashboard displays the employee's name 810, optional photograph 812, contact information 814, and location 816 that are normally expected in a simple directory application. The employee profile 800 also includes an organizational hierarchy 820 that displays the employee's P&L group, department, and division. The organizational hierarchy 820 may be populated by filtering ADb on the employee and his relationships to a P&L Group. A reporting relationship nugget 830 displays the employee's supervisor and the employees directly reporting to the employee and may be populated by filtering ADb on the employee and the relationship types, Manages and Managed By. A roles nugget 840 displays the employee's role in the organization. A shared documents nugget 850 displays the documents the employee is entitled to access or modify and may be populated by filtering on the employee's entitlements. A membership nugget 860 displays the employee's membership in groups and committees and is based on the employee's multiple roles in the organization. The employee profile 800 illustrates the usefulness and power of ADb to simply leverage accurate and current data from different authoritative data sources and transparently combine the data into useful information.

Figure 9:
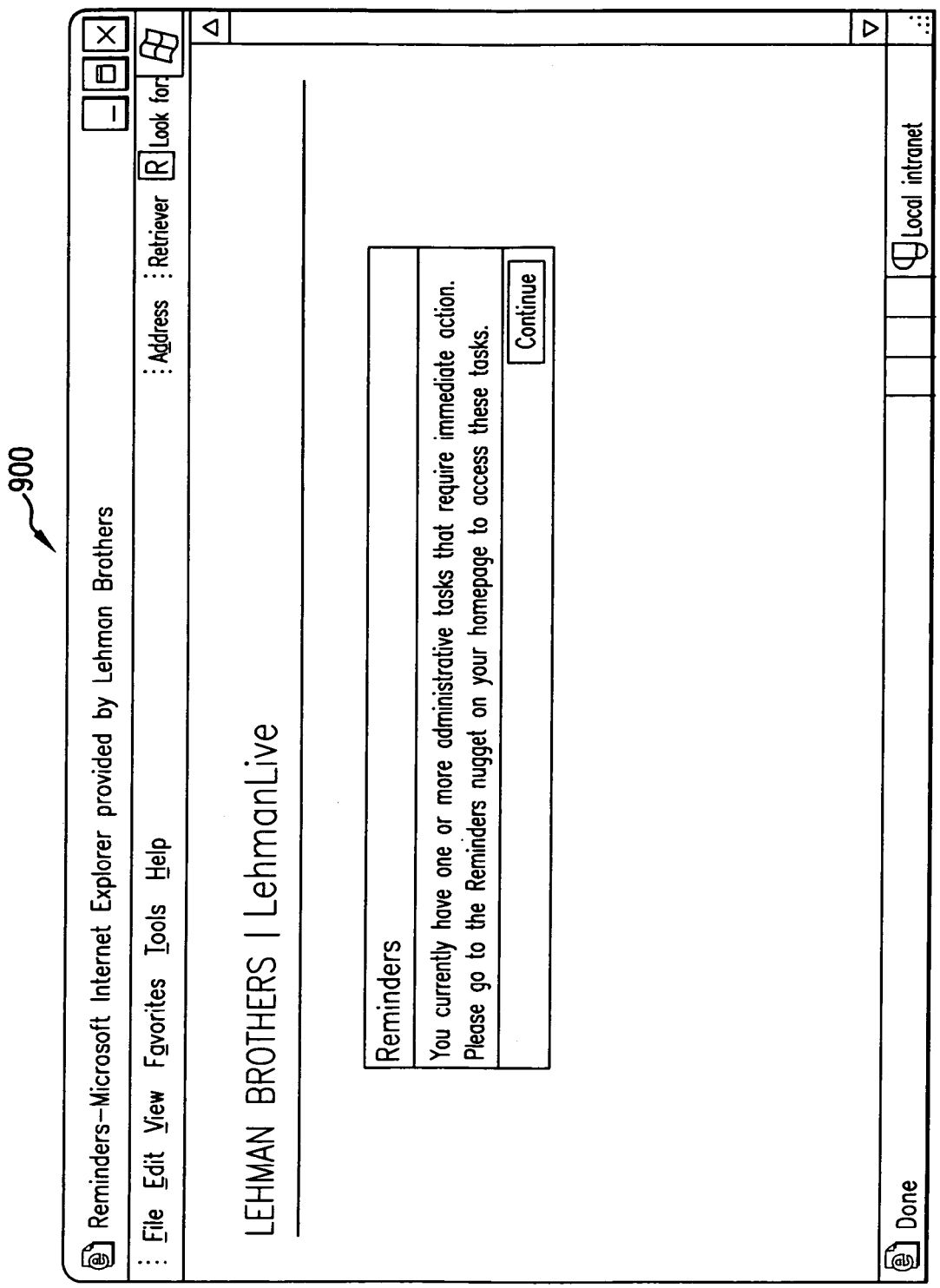
FIG. 9 is an illustration of a reminder notice displayed in some embodiments of the present invention.

FIG. 9 is a screenshot of a reminder notice 900 that may be displayed whenever a user must complete an administrative task. The reminder 900 may be generated automatically by ADb from an exception report generated by the data feeds from the authoritative data sources and directed to the user by filtering on the roles and relationships of the user. In the illustrative example shown in FIG. 9, the reminder notice 900 directs the user to a reminders nugget on the user's homepage for more details and links to complete the unfinished tasks. The reminder notice may change with additional warnings if the task is not completed within a predetermined time period.

FIG. 10a is an exemplar illustration of a homepage 1000 displaying an administrative nugget 1010. FIG. 10b shows a detail of the administrative nugget shown in FIG. 10b. In FIG. 10b, the administrative nugget 1010 lists the task reminders that the employee must complete. Each task reminder includes a due date or deadline 1012, a short explanation of the reminder 1014 and a link 1016 to a page where the user can complete the administrative task. Each reminder is directed to the user based on the user's role. As an illustrative example, the Performance Goals reminder 1020 is directed to the user based on his role as manager of an employee that has not completed his performance goal within a predetermined period. The user is identified as the employee's manager by filtering ADb on the employee's Managed By relationship. The Performance Goals reminder 1020 has escalated the reminders up the employee's chain of command because the employee has not responded within a predetermined period. The reminder to the supervisor may encourage the supervisor, in this instance the user, to urge the employee to complete his performance goals task quickly. In this manner, any missing data or inconsistencies in ADb are quickly resolved by involving the employee's management. Furthermore, the task of finding the employee's supervisor is handled by ADb because the management structure of the organization is already incorporated into the ADb structure.

A business continuity reminder 1030 asks the user to update or confirm the user's emergency contact information. The business continuity reminder 1030 may be generated by a Business Continuity Plan (BCP) group that is responsible for business continuity planning for the organization. The BCP group may have a policy that every employee should confirm or update their emergency contact information periodically to keep the BCP current and the user has received this reminder through is role as an employee of the organization. The policy may be implemented by leveraging ADb to "enforce" the policy by involving the employee's supervisors, if necessary, to make sure the contact information is always current. The BCP group does not have to maintain their own list of supervisors for each employee because they can leverage that information from ADb and be confident that the information is accurate and complete.

A new employee reminder 1040 has been directed to the user through his role as manager of a P&L Group to provide more information about the new employee. The new employee reminder may be generated automatically from the daily exception report of the Person inventory data feed from HR. The new employee is added to the HR application when he is hired and assigned a P&L Group. During the daily data feed ADb compares the data feed to its existing Person inventory and generates an exception because the new employee is not in ADb's existing Person inventory. Using the new employee's P&L Group assignment, ADb may automatically generate a reminder to the manager of the new employee's P&L Group.

In a preferred embodiment, a module in ADb executes whenever a data feed is received by ADb. The module compares the data feed with the existing inventory in ADb and generates an exception report identifying the assets that have changed. The module may also verify that all relationships to the changed asset are still valid. In the instant example where the new employee has joined a P&L Group, the manager of the P&L Group is reminded to complete initial processing of the new employee. The initial processing of the new employee may include adding relationships for the new employee to ADb that connect the employee to other assets in the organization such as, for example, responsibility for an application owned by the P&L Group, membership in ad-hoc groups that require participation by the P&L Group, or supervision of other employees in the P&L Group. The module identifies the P&L Group manager by filtering ADb on the P&L Group and the appropriate relationship type. The module may send a reminder to the P&L Group manager that includes a link to a web page where the manager can provide the required information to ADb.

A T&E approver reminder 1050 is displayed on the user's homepage screen through his role as an administrator of a P&L Group. The reminder 1050 asks the user to go to the link provided to assign a manager to the P&L group that the user administers. The reminder 1050 may be generated automatically and may arise because the employee that managed the P&L group left the group or the P&L group is a new group. If the employee has left the group, the daily feed from HR would generate the exception, and if a new P&L group is created, the data feed from the group responsible for P&L groups such as, for example, finance would generate the exception. In either case, ADb generates the exception based on the data feeds from the authoritative data sources. By generating the exception report, ADb relieves the authoritative data source providers from having to notify the groups within the organization that could be affected by the changes.

A department reminder 1060 is displayed on the user's homepage screen through his role as a Chief Administrative Officer (CAO) of a division. The reminder 1060 asks the user to go to the link provided and assign a manager to the department. The reminder 1060 may be generated automatically by ADb from an exception from a Person or Department inventory data feed from their respective authoritative data source.

In the instant example, an ADb module may execute whenever the data feed from the authoritative data source is received by ADb. The module compares the data feed to the inventory existing in ADb, identifies all changes in the inventory, and updates the inventory with the data feed. For example, if a new Department is contained in the data feed, the module identifies the new Department as a change because it is not in the ADb's inventory prior to the data feed update.

The module may check ADb to verify that the required relationships to the new Department exist in ADb. For example, a business rule or policy in ADb may require that each Department asset include a relationship to a Person asset type with a role of "Managed By." The module filters ADb on the Department asset and the "Managed By" relationship type and gets a null result because the "Managed By" if the relationship has not been created. The module sends a reminder to the manager of the next higher administrative unit, which in this instance is the Division manager. The module may determine the identity of the Division containing the new Department by filtering ADb on the new Department's "Belongs To" relationship type. Similarly, the Division's manager many be identified by filtering ADb on the Division containing the new Department and the "Managed By" relationship type. Alternatively, the module may filter ADb on the new Department and an entitlement authorizing a change in the "Managed By" relationship for a Department to identify the person authorized to assign a new manager for the new Department. The module may include a reminder in the manager's homepage with a link to a web page or HTML document that allows the manager to assign a new manager to the new Department. The module may receive the data from the web page and automatically update ADb with the input data. The module may also send a confirmation notice to the Division manager. The module may be executed on a single processor or may be comprised of one or more sub-modules that execute on one or more processors.

FIG. 11 is an illustration of a compliance report used in some embodiments of the present invention. In FIG. 11, a compliance report dashboard 1100 displays compliance status for an entire division. The dashboard 1100 includes a report filter 1110 for generating a compliance report for a specific project. Projects are preferably selected from a drop down menu 1115 that may be populated based on the entitlements of the user. An overview nugget 1120 displays summary statistics for the specific project and allow the user to view compliance at the department level or drill down to the P&L Group level. In a preferred embodiment, a compliance percentage indicating the percent of each group in compliance is displayed and color-coded to focus the attention of the user to the "problem" groups or departments. A mailing list nugget may be displayed that includes a list 1140 of addresses of each non-compliant employee and a list 1160 of addresses of each manager of the non-compliant employee. The user may cut and paste the list into a short email message that is sent to each non-compliant employee and his or her manager. There is nothing like an email message from his division manager to motivate the employee to complete the task quickly, especially when reinforced by a message from the employee's direct supervisor to do the same. It may be priceless.

ADb takes advantage of the network effect wherein ADb's usefulness increases as more groups contribute their data to ADb. The transparency of the data contained in ADb enables the rapid creation of applications at low cost. For example, an application for an organization-wide campaign may be developed for as little as $10-20 k. The new application can be developed at low cost because the application can leverage the data already in ADb through a common vocabulary. Instead of identifying the required data sources, obtaining permission to access the data sources, and writing custom interfaces to each data source, a developer for an ADb application can directly access the data through ADb and have high confidence in the quality, accuracy, and timeliness of the data. Furthermore, campaigns to collect information across the entire organization usually have a high success rate because of the accountability built into ADb via the mapping of each asset to an administrative unit in the organization. The mapping allows for the quick identification of a person responsible for the asset and that person's chain of command, both upward and downward in the organization.

The data model used in ADb allows each application to manage its own data while allowing the organization to access that data. An application may create new asset types, relationship types, property types, and roles that are unique to the application. Control of the data generated by the application is managed through ADb's entitlements. An example of a business continuity plan (BCP) application that leverages ADb is now described.

Every organization should have a BCP to handle unexpected situations or disasters. The attack on 9/11 further emphasized the need for a BCP. Much of the information required in a BCP such as employee information are already in ADb and leveraging the information in ADb can reduce the cost of developing and maintaining a BCP for the organization.

U.S. Pat. No. 6,754,674 issued on Jun. 22, 2004 to Meyers et al. describe systems and methods for generating response plans that use a computer network to receive information from a user that is used to generate a crisis plan. The system also allows for importation of data into the system and can store the crisis plan on the network. The described system, however, cannot determine when the crisis plan must be updated to reflect changes in the organization that may affect the crisis plan or provide a mechanism to encourage the user to update the plan in a timely manner.

Meyers illustrates one of the vulnerabilities of continuity planning—that of keeping each plan up to date. Much of the current continuity planning is scenario and task based wherein a scenario is postulated and a plan is formulated as a set of tasks to be performed in response to the postulated scenario. A BCP is created for each scenario and each BCP must be updated. The maintenance of several BCPs can quickly become burdensome because resources must be expended to maintain plans constantly for events that may never occur.

The attack on 911 highlighted another vulnerability of task-based plans. Although the plans were invaluable during the later stages of recovery from 911, recovery teams spent the initial hours or days after 911 reacting to the situation. A lesson learned from the 911 attack is that a BCP should be flexible enough to accommodate the initial period of recovery when the recovery team is reacting to the crisis and provide accurate and up-to-date information that the recovery team needs to make decisions during this initial period.

In some embodiments of the present invention, a BC portal may serve web pages containing BCP information to the employee's web browser over an organization's intranet. The BC portal provides up-to-date and accurate information to a recovery team that supports their decision-making during the first hours of an incident. The BC portal may support the recovery team by identifying the mission critical assets that must be recovered, the order in which they should be recovered, the location of these assets, and the people responsible for these assets. The BC portal may also provide automated status reports for top-level managers that quickly show compliance with the business continuity policies of the organization. A top-level manager may quickly drill down through the organization to view compliance at the lowest level of the organization.

The BC portal may display individualized web pages to each employee on their web browser providing BCP information specific to that employee and new information to educate the employee about changes in the BC plan or policies. The BC portal may leverage the ability of ADb to retrieve a person's chain-of-command to ensure that information pushed to an employee is acknowledged and that any information required from the employee is quickly received. The BC portal may also leverage the authoritative data feeds to ADb to become aware of any changes in the organization that require BCP specific information and obtain that information at very low cost.

The ability to push information to every employee is desirable during the initial recovery period when assumptions in the BCP are found to be invalid. For example, a BCP may designate employee A to a recovery team with the responsibility for recovering application A. If an incident occurs but employee A is on vacation or otherwise unavailable, ADb can quickly identify a backup to employee A that can recover the application. The BC portal can push information to employee B that tells employee B to report to a recovery location to recover application A.

Figure 12:
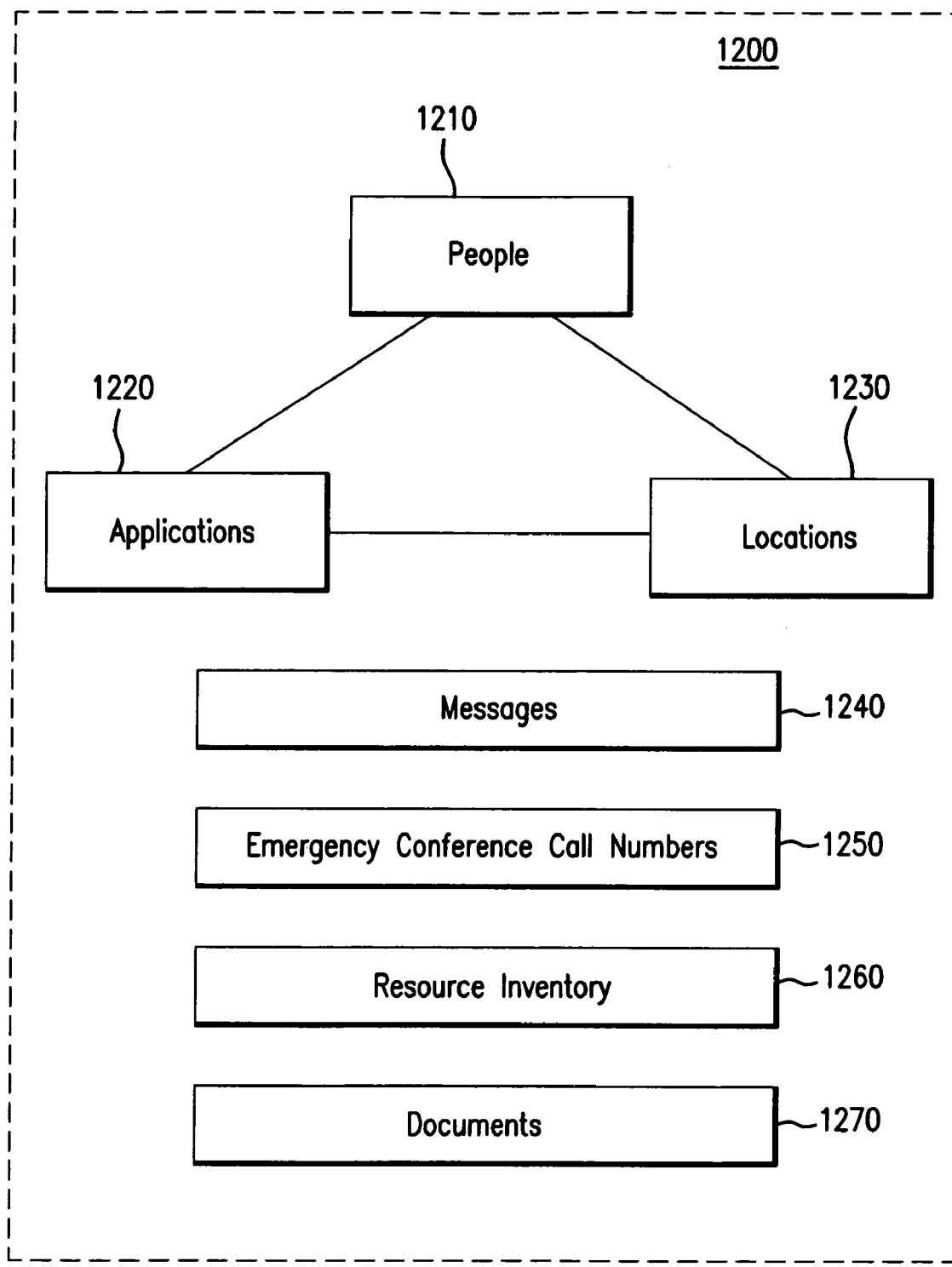
FIG. 12 is a block diagram illustrating the assets in a BC Plan used in some embodiments of the present invention.

FIG. 12 is a block diagram illustrating the assets in a BC Plan used in some embodiments of the present invention. In a preferred embodiment, a BC Plan is created for each region of a division and a department. Each BC Plan 1200 includes a list of people 1210 covered by the plan 1200, a list of locations 1230 within the organization, and a list of applications 1220 used within the organization. Each application is linked to a location and a person such that the location of the server or host running the application and the person responsible for the application may be identified quickly. Similarly, each person is linked to a location and may be linked to an application. Also included in the BC Plan 1200 are a list of predetermined messages 1240 that may be displayed or transmitted to members of the plan to provide initial instructions such as assembly locations or may provide more specific information according to the role of the person receiving the message. A list of emergency conference call numbers 1250 may include phone numbers, pin numbers, and descriptions of all emergency call bridges that may be used in the event of an incident. A resource inventory 1260 provides a list of all assets that are available to the recovery staff at a recovery location. Assets may include hardware such as personal computers, printers, fax machines, and supplies. The resource inventory 1260 may be posted on a web page accessible to members of the recovery team so that they know what will be available to them at the recovery location. A list of documents 1270 may be posted by the BC coordinator to provide the recovery team access to division level or business specific documents that may be required during the recovery effort.

In a preferred embodiment, the BCP application may be integrated with ADb by adding appropriate records to the data model described above. For example, a BCPLAN and a BCP_GROUP asset type may be added to the asset type table. Each BC plan may be assigned a BCPLAN asset type.

A BCP_GROUP asset type may be used to group the employees of the organization associated or covered by a specific BC plan. In a preferred embodiment, a policy may be instantiated to require every person in the organization belong to a BCP group. Employees may be added to a BCP group through the employee's P&L Group by assigning one or more P&L Groups to the BCP group. The membership list of each BCP group may serve as a call list for the BC Plan. In some embodiments, every person may be assigned to either a recovery team or a standby team within the BC group. If a person is on the standby team, the person may work from home during the recovery but be on call to help with the recovery if the need arises. A person on the recovery team may participate in the recovery at the work site and may be assigned to a primary and a secondary location. The assignment to either recovery or standby may be indicated by as a flag property type associated with the BCP_GROUP asset type. Other BCP groups may be created for notification purposes and based on the role of the members in the group. For example, a BCP group may be created consisting of all managers in a department.

Several BCP-specific roles may be created by adding the appropriate entries in the role type table of ADb. For example, each plan may be assigned a BCP Coordinator that owns and assumes ultimate responsibility for the plan. The BCP Coordinator may appoint one or more BCP Administrators that are assigned the day-to-day responsibility for maintaining part or all of the plan. Each BCP Administrator assigned responsibility for maintaining part of all of the plan is given the same entitlements to read and update the plan as the BCP Coordinator. The BCP Coordinator may appoint one or more BCP Administrators that are assigned to a BCP group and are responsible for managing one or more call trees for the group. Administrators managing call trees only may be restricted from accessing other parts of the plan by the BCP Coordinator. A BCM contact may be assigned to a person belonging to a business contact management (BCM) team to act as a contact for a division's BC plans. The contact provides assistance and support in the creation and management of the BC plans within the division. A BCP_Primary_Loc and BCP_Sec_Loc roles may be created to relate a person to a primary and secondary location, respectively. The location may be a building, floor, or room.

Each BC plan may present different portions of the plan according to the role of the user. For example, a BCP coordinator may need full access to create and maintain the plan. The BCP coordinator may view a web page that presents the details of the plan and allows the coordinator to make changes to the plan. In contrast, an employee may be presented with a web page that displays only information relevant to that employee. A top-level manager may be presented with a page displaying summary information of the status of compliance across his administrative unit.

FIG. 13 is an illustration displaying portions of a BC plan relevant to an employee covered by the plan. The display shown in FIG. 13 may be a web page 1300 displaying information from the plan according to the roles of the employee. Web page 1300 may be delivered from a BCP portal server over the organization's intranet to the employee's web browser in response to a request from the employee's browser. In a preferred embodiment, web page 1300 may automatically display at regular intervals and prompt the employee to confirm that they have read and understood the information presented and update their information. In FIG. 13, the web page 1300 may display a contacts nugget 1310 that identifies the employee's BCP Coordinator and BCM Contact along with their contact information. A message nugget 1330 may display information pertinent to the employee such as an evacuation assembly location for the employee's group. The information displayed in the message nugget 1330 may be a predetermined message or one or more specific messages based on the roles of the employee. The messages may be pushed to an employee through third party wireless devices. A recovery location nugget 1340 displays the recovery location for the employee. A conference lines nugget 1350 displays the emergency phone numbers the employee may use to call in or receive up-to-date information during an incident. A document library nugget 1360 displays a links to the recovery documents that cover the employee's group. A BCP groups nugget 1370 displays the BCP groups containing the employee. A reference nugget 1380 displays links to other supporting materials for the BC plan that the employee can review.

A critical applications nugget 1320 displays the applications that are considered critical to the organization's operation. In a preferred embodiment, each application on each server in the organization is assigned a tier level according to the necessity of the application to the operation of the organization. Recovery teams may bring up applications identified as mission critical before other applications are recovered. The tier level assigned to each application prioritizes the recovery effort for the recovery teams.

Figure 14:
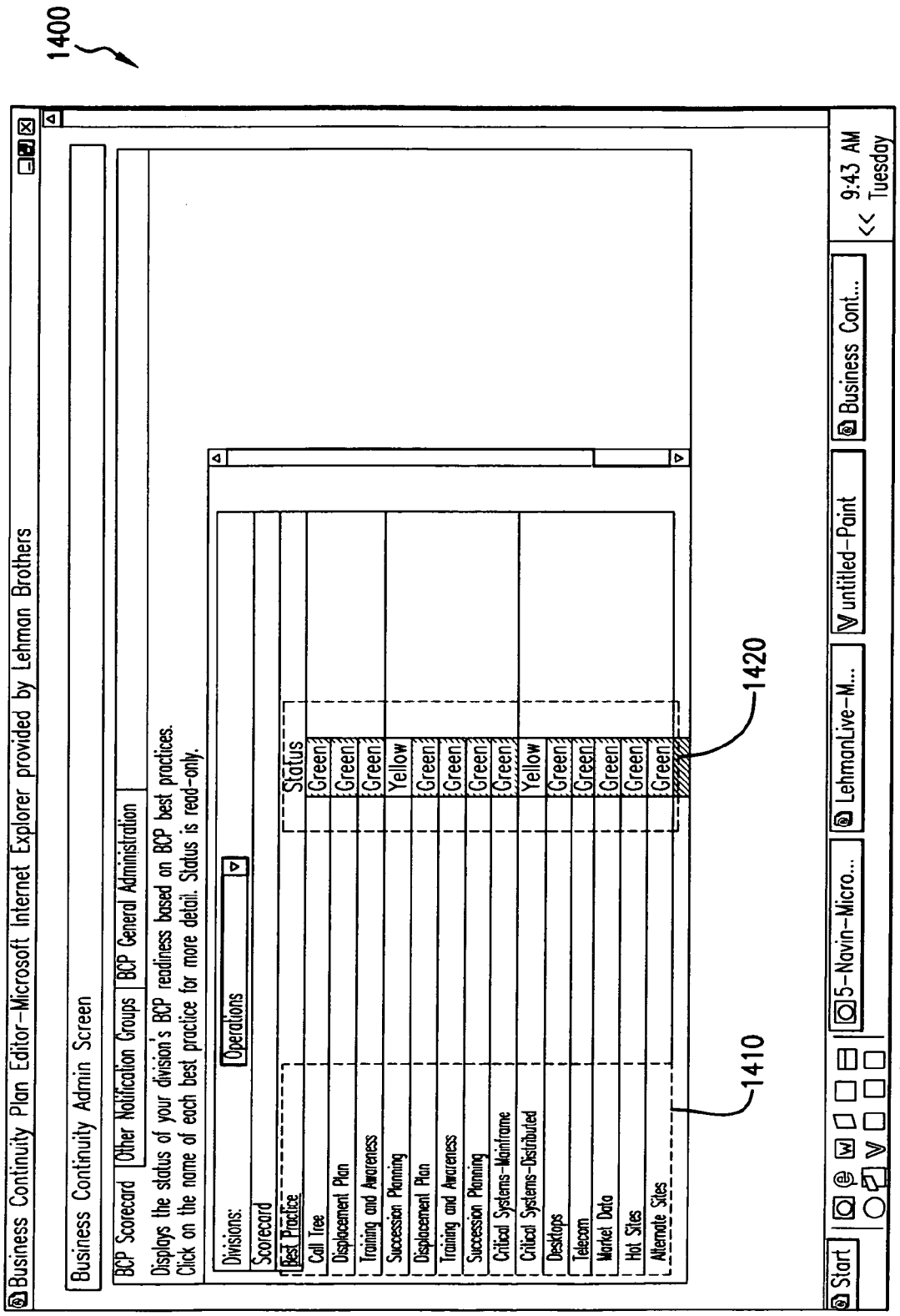
FIG. 14 is an illustration displaying BCP summary information in some embodiments of the present invention.

FIG. 14 is an illustration displaying summary information that a high-level manager may need. In FIG. 14, a scorecard 1400 displays a list of best practices 1410 and indicates a status 1420 for each of the best practices displayed on the scorecard. Each best practice may be a policy that continuity planners generally agree should be incorporated into any BCP or may be a policy that is important to the organization. For example, a best practice may be a policy that requires every employee belong to at least one call tree. Other policies may require daily backups of certain applications or even primed alternate sites capable of hosting critical applications. Other policies may address non-technical areas such as requiring legal or insurance documentation maintained such that they are available at the recovery site in a crisis or establishing short and intermediate liquidity facilities with multiple vendors.

A status list 1420 displays a status of each best practice in the corresponding best practices list 1410. The status list may be color coded to indicate the status of a best practice. In a preferred embodiment, each best practice may be assigned one of three status levels depending on the compliance of each best practice. For example, a green status indicator may indicate 100% compliance, a red status indicator may indicate less than a predetermined compliance level and a yellow status indicator may indicate less than complete compliance but greater than the predetermined compliance level. The predetermined compliance level may be set to a different value depending on the best practice. For example, a call tree best practice may be assigned a predetermined compliance level of 90% but a training and awareness best practice may be assigned a predetermined compliance level of 75%.

The status of each best practice may be set manually by a member of a BCM team or may be automatically determined from information in ADb. In an illustrative example, a policy may require that each tier 1 application be disaster recovery tested every six months. The last test date of each tier 1 application may be stored in ADb and compared to the current date to determine if the application is in compliance.

Figure 15:
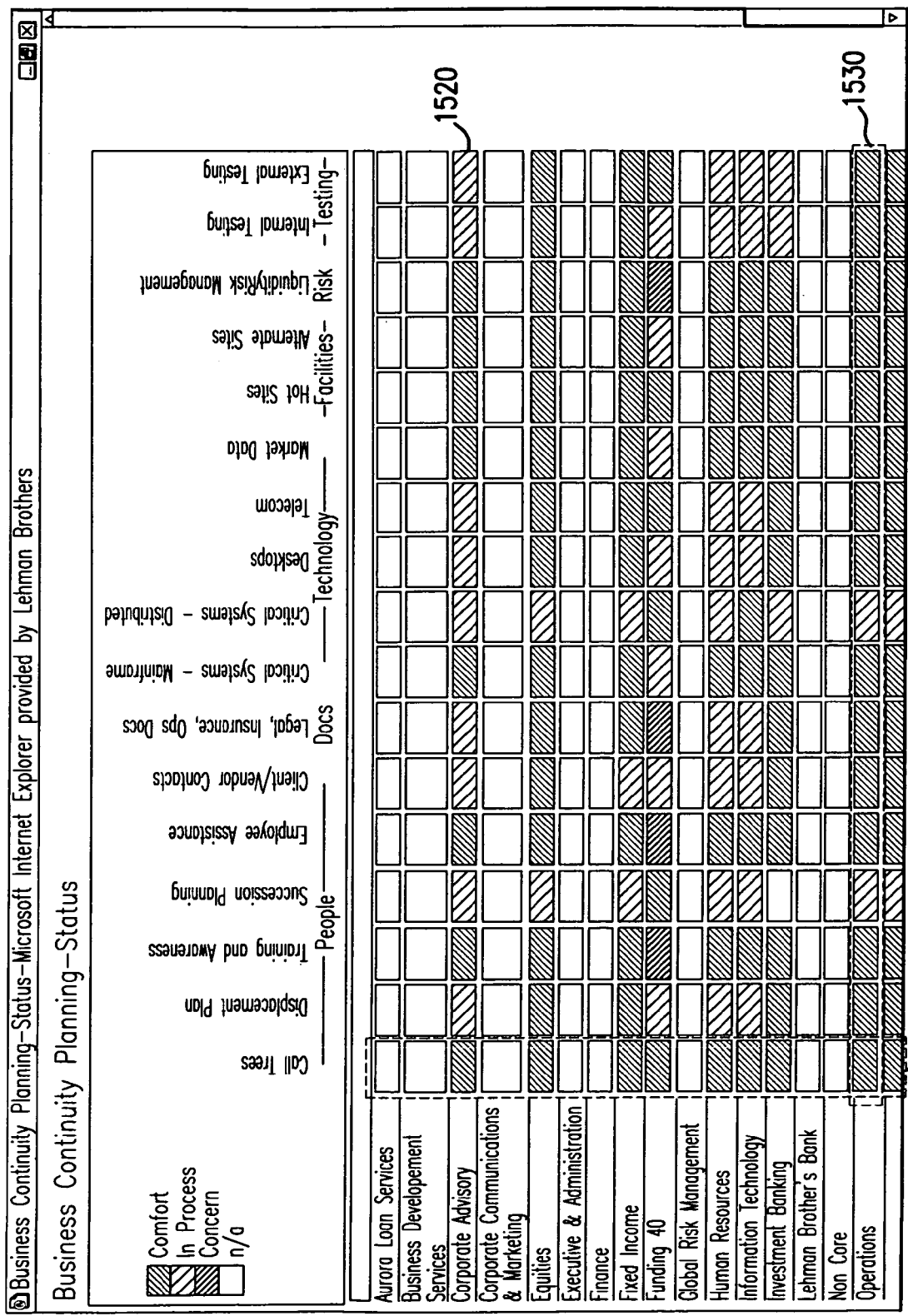
FIG. 15 is an illustration displaying another view of BCP summary information in some embodiments of the present invention.

FIG. 15 is an illustration displaying summary information for a high-level manager segmented by administrative groups reporting to the high-level manager. In FIG. 15, a status indicator 1520 is displayed for each best practice and each administrative group reporting to the high-level manager. Each column 1510 of indicators represents a best practice. Each row 1530 of indicators represents the compliance for each administrative unit. The display shown in FIG. 15 allows the high-level manager to quickly assess the overall compliance of his/her department or division and identify groups or best practices that may require attention to increase BCP compliance.

Figure 16:
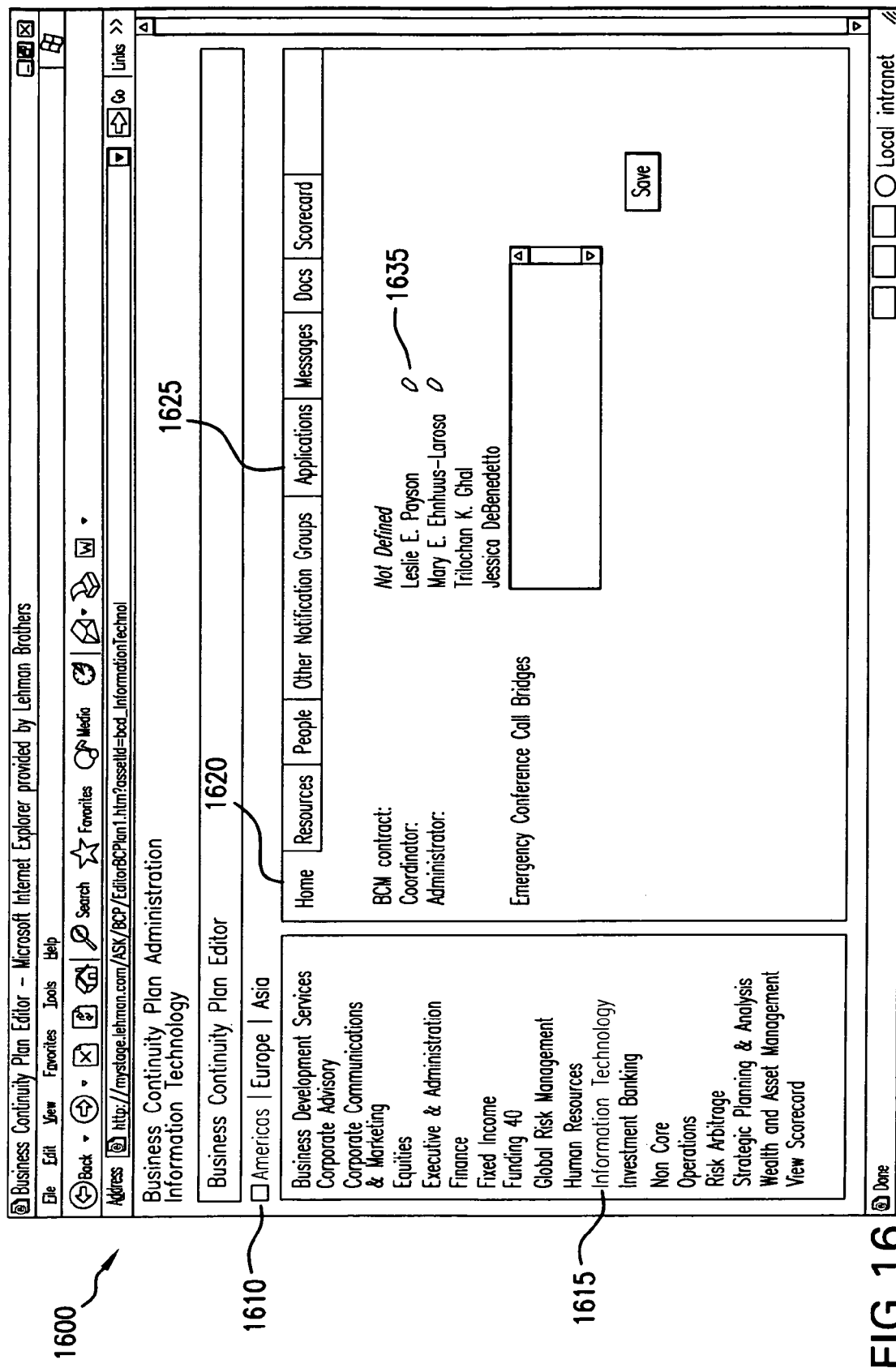
FIG. 16 is an illustration displaying a BCP editor in some embodiments of the present invention.

FIG. 16 is an illustration displaying a BCP editor for a BCP Coordinator. The BCP editor 1600 may be used to create, modify, and maintain a BC plan. In a preferred embodiment, information entered into the BCP editor may be stored in ADb. In FIG. 16, a region nugget 1610 indicates a selected region covered by the plan. A departments nugget 1615 indicates a selected department. One or more tabs 1625 may be displayed that represent different parts of the plan that may be edited by the user. In FIG. 16, a home tab 1620 is selected and displays a home view 1630. The home view 1630 identifies a BCM contact, a BCP Administer, and one or more BCP Administers for the plan. An edit icon 1635 indicates the people authorized to edit the plan.

Figure 17:
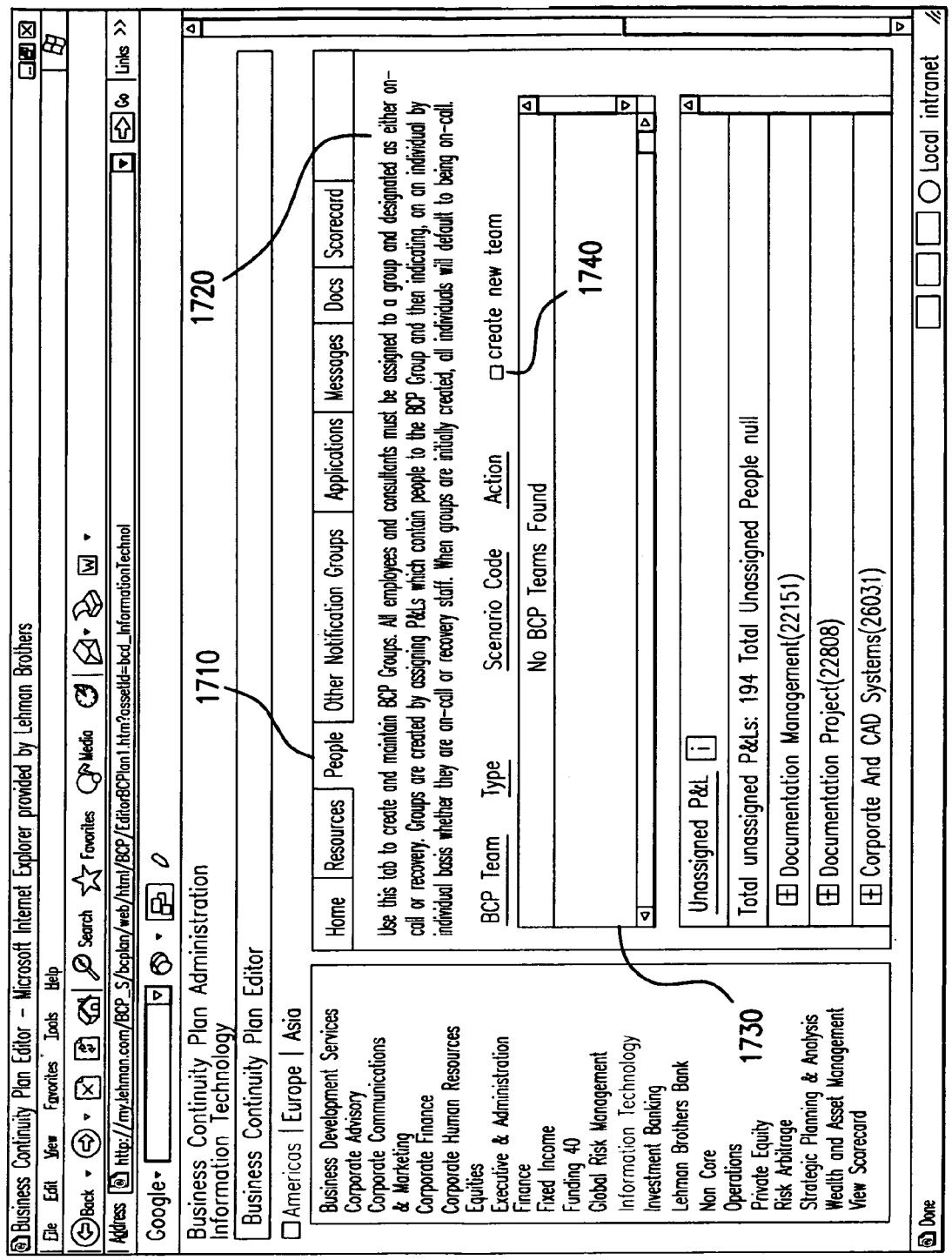
FIG. 17 is an illustration displaying another view of the BCP editor in some embodiments of the present invention.

BCP groups may be created and maintained by selecting a People tab in the BCP editor. FIG. 17 is an illustration displaying another view of the BCP editor 1700 with the People tab 1710 selected. In FIG. 17, an information nugget 1720 displays information to the user about the displayed page 1700 and may provide instructions to the user. The user may view a list of BCP Groups in a team list window 1730. The user may create a new group, or team, by clicking on a link 1740. The BCP coordinator may kick off a call tree for a BCP group by selecting a call action in the people tab of the BCP page. Once the call action is selected, the system calls an automated notification system and connects to the coordinator's phone to the automated notification system where he/she can record a message and start the call tree. If the coordinator has a pre-recorded message stored on his/her computer, the system may use the pre-recorded message and start the call tree without further coordinator intervention.

FIG. 18 is an illustration displaying a view of a BCP Group editor that may be displayed when the user clicks on the create new group link 1740. A group editor page 1800 may include an editable field where the user can enter a BCP Group name. Group editor page 1800 may display the BCP Coordinator and BCP Administrators for the group. New BCP Administrators may be added, modified, or deleted by clicking on an icon 1820. A description field may be displayed where the user can enter a description of the BCP Group. The user may click on a save button 1840 to save changes made on the page 1800 and display an available P&Ls view. A scenario code 1850 associated with a notification group may be displayed indicating an incident scenario that would activate an automated call tree for that notification group.

FIG. 19 is an illustration displaying an available P&Ls view 1900 when an Available P&Ls tab 1910 is selected. View 1900 includes a list 1920 of P&L groups assigned to the BCP Group and a list 1930 of unassigned P&L Groups that may be added to the BCP Group. The list of assigned and unassigned P&L Groups may be populated by filtering ADb on asset type and a "Belongs To" relationship with the division or department associated with the BC plan. The user may click on a delete button 1935 to delete an assigned P&L group from the BCP group or may click on an add button 1935 to add an unassigned P&L group to the BCP group. When a P&L group is added to the BCP group, a "Belongs To" relationship is created for each person in the P&L group to link that person to the BCP group. When a P&L group is deleted from the BCP group, the "Belongs To" relationship to the BCP group is deleted for each person in the P&L group. Using P&L groups to assign membership to a BCP group is more efficient because groups of people may be assigned at once instead of individually adding each person to a BCP group. BCP group assignment via P&L groups also ensures that every person is assigned to a BCP group because every person is already assigned to a P&L group.

Figure 20:
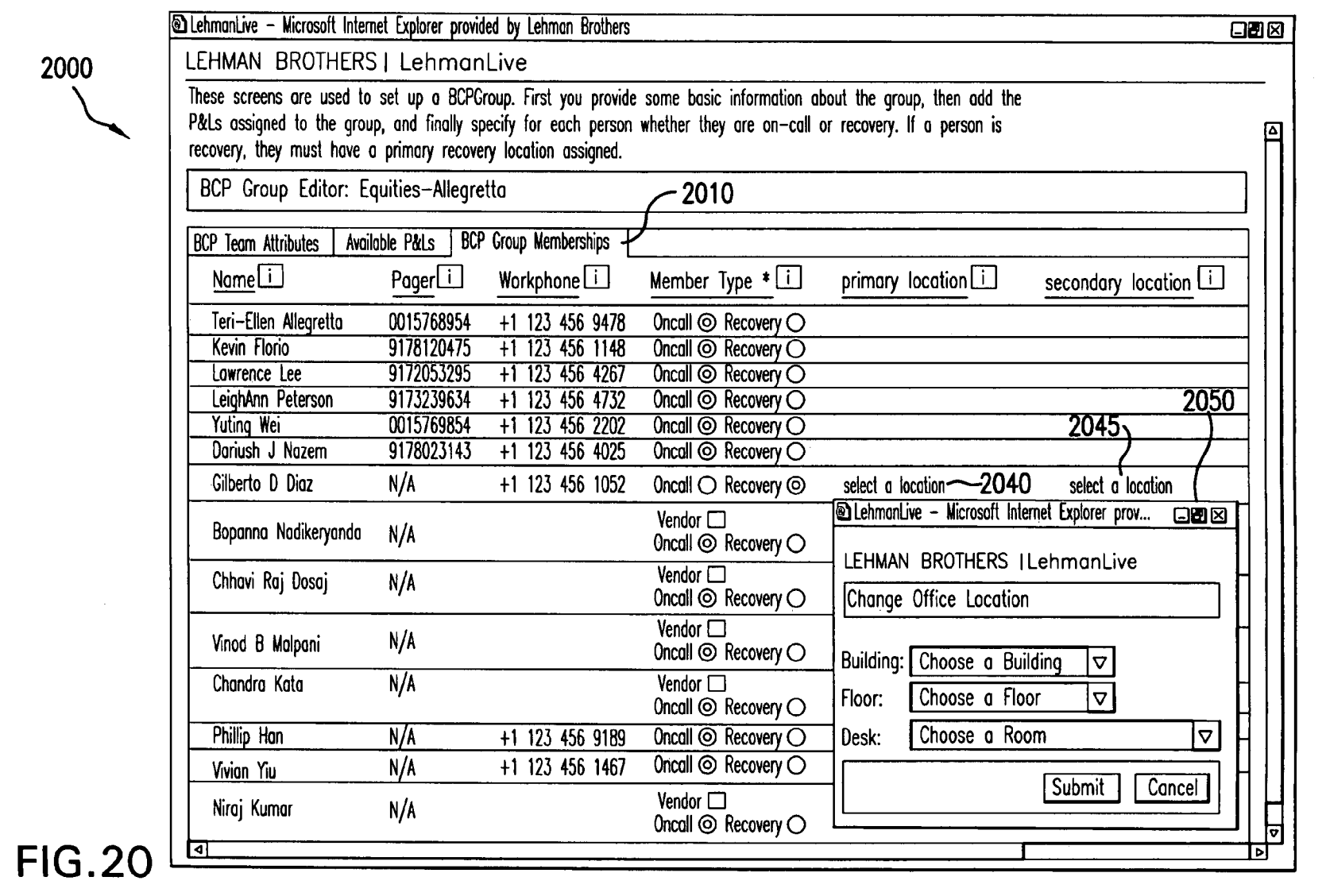

FIG. 20 is an illustration displaying a group memberships view 2000 when a BCP Group Memberships tab 2010 is selected. In FIG. 20, a list 2020 containing the members of the BCP Group is displayed. For each BCP group member, a person's pager number 2022, work phone number 2024, and member type 2026 are displayed. The person's pager and work phone numbers may be stored as a Person Property type and retrieved when the member list 2020 is populated. The BCP Coordinator or Administer may assign each member to a recovery team or an on-call team by clicking on the appropriate control displayed under Member Type. If a person is a consultant that the organization does not directly manage and does not have a primary location at an organization location, the BCP Coordinator may assign a Vendor type for that person. In the event of an incident, members classified as vendors may not be contacted. If a member is part of the recovery team, a prompt 2040 is displayed requesting the user to enter a primary recovery location. A second prompt 2050 is displayed requesting the user to enter a secondary recovery location. In response to the user selecting a prompt, a window 2050 is displayed where the user may enter the recovery location.

Figure 21:
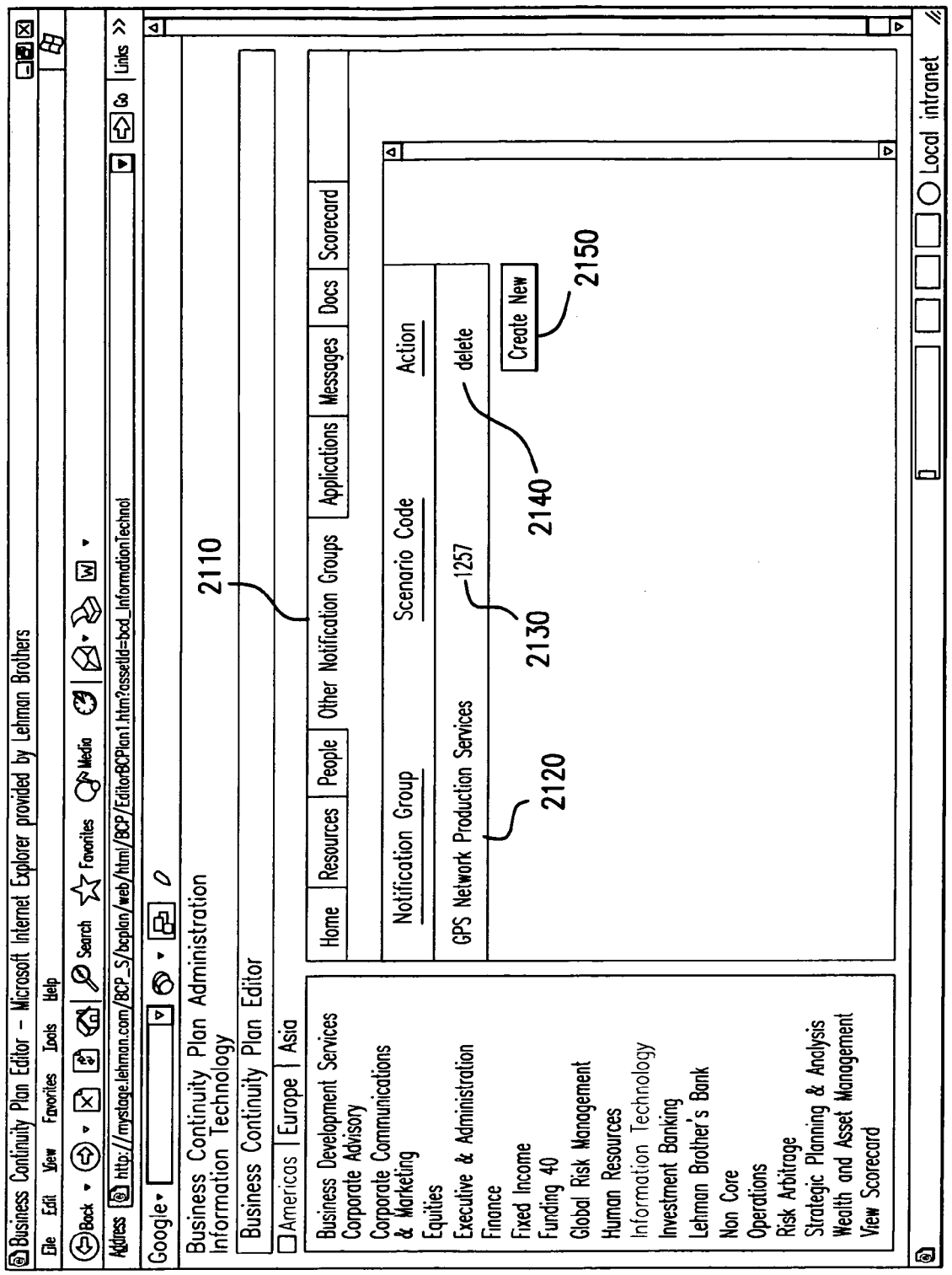
FIG. 21 is an illustration displaying an Other Notification Groups view of the BCP editor in some embodiments of the present invention.

The BCP Coordinator may optional notification groups by selecting an Other Notification Groups tab in the BCP editor. FIG. 21 is an illustration displaying an Other Notification Groups view 2100 when the Other Notification Groups tab 2110 is selected. View 2100 includes a list of notification groups associated with the BC plan. The Other Notification Groups may be used purely for notification purposes and may include members that are not part of the on-call or recovery groups or belong to different divisions of the organization. A scenario code 2130 associated with the notification group may be displayed indicating an incident scenario that would activate an automated call tree for that notification group. The user may delete a notification group by clicking on a delete control 2140 or may add a new notification group by selecting a Create New control 2150.

Figure 22:
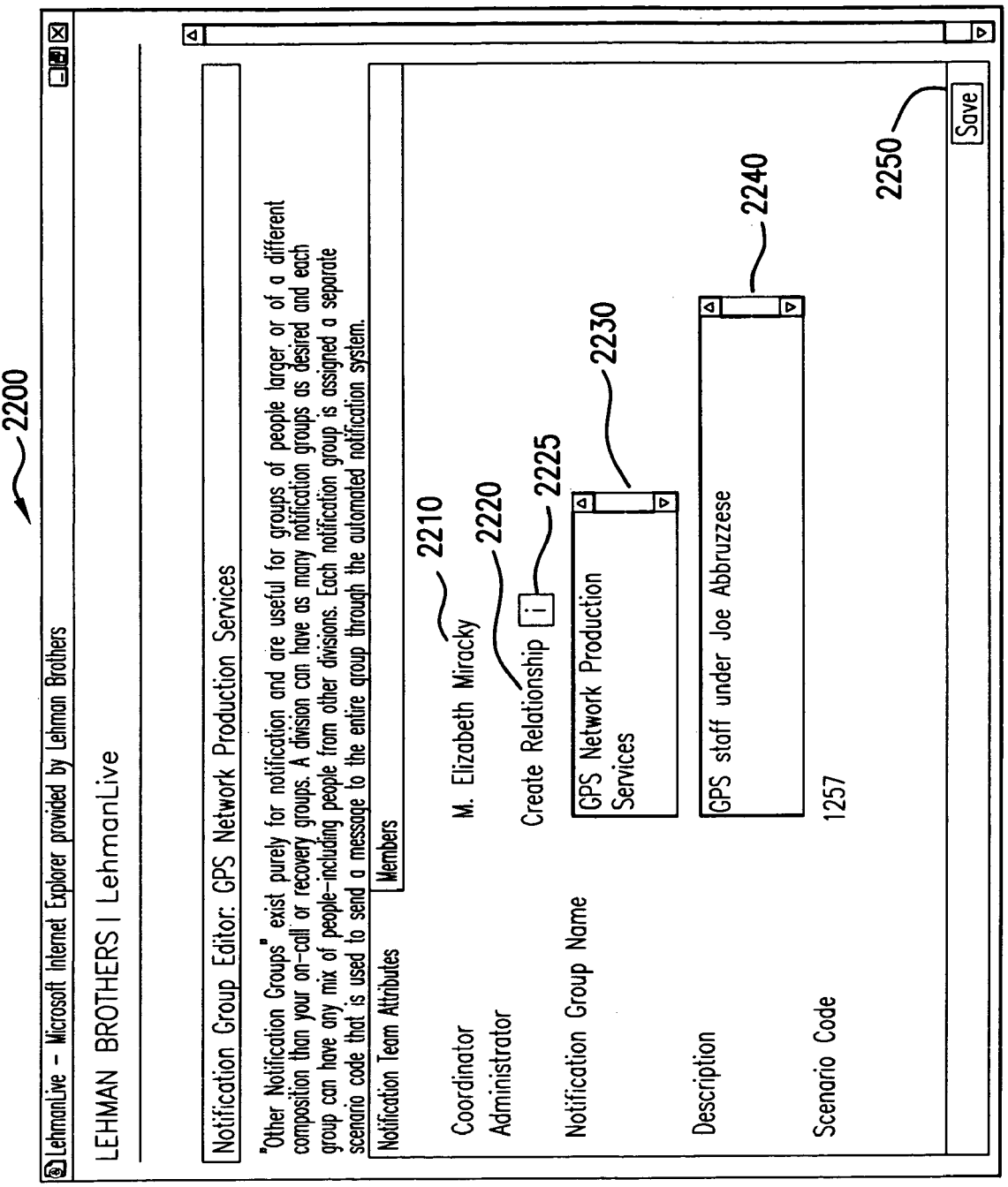
FIG. 22 is an illustration displaying a notification team attributes view of the Notification group editor in some embodiments of the present invention.

FIG. 22 is an illustration displaying a notification team attributes view that may be displayed when the Create New control 2150 is selected in the Other Notification Groups view of a Notification group editor. In FIG. 22, an attribute view 2200 includes a display of the BCP Coordinator 2210 for the BC plan associated with the notification group. If an administrator for the notification group is not assigned, a prompt 2220 is displayed that the user can select to create a relationship between a person and the notification group with a role of administrator. An information icon 2225 may be displayed that provides additional information to the user when selected. View 220 includes a name field 2230 where the user may enter a name for the notification group. A description field 2240 may be displayed where the user may enter a description of the notification group. A Save button 2250 may be selected by the user to save the information entered in view 2200.

Figure 23:
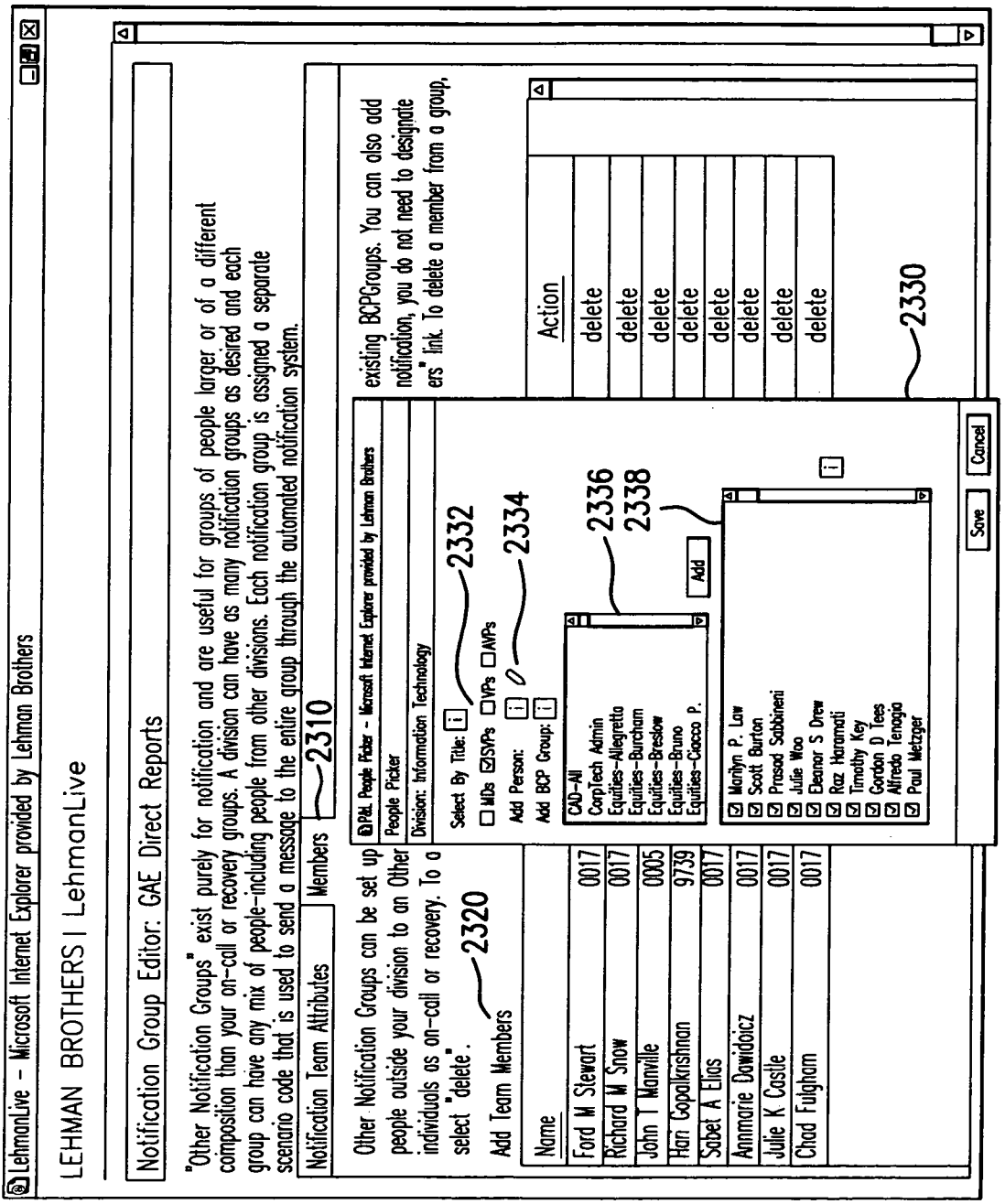
FIG. 23 is an illustration displaying a members view in the Notification group editor in some embodiments of the present invention.

Members may be added to the notification group by selecting a Members tab in the Notification group editor. FIG. 23 is an illustration displaying a members view 2300 in the Notification group editor when a Members tab 2310 is selected. In FIG. 23, a notification group member list 2320 is displayed and may include each person's phone and pager number. A new member may be added by selecting an Add Team Members control 2325. Selecting control 2325 displays a pop-up window 2330 where the user may select new members for the notification group. The user may select new members by title, by name, or by BCP Group. Pop-up window 2330 includes one or more check boxes 2332 that the user may check to select a new member by title. The user may click on an icon 2334 to select a new member by name. Pop-up window 2330 includes a list box 2336 displaying a list of BCP groups that the user may select to add members by a BCP Group. Selected members are displayed in a members list box 2338. A check box may be displayed next to each selected member such that the user may deselect the person to exclude that person from the notification group. The selected members may be added to the notification group by clicking on a save button 2340.

Having thus described at least illustrative embodiments of the invention, various modifications, and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. An system, comprising:
   an asset table comprising at least one asset record representing an asset, the at least one asset record characterized by an asset type, wherein an inventory of assets of the same asset type is provided to the asset database by an authoritative data source;
   a role type table comprising at least one role type record representing a role, the at least one role type record characterized by a role type;
   a relationship type table comprising at least one record representing a relation between a first asset type and a second asset type via the role type, wherein one or more of the asset records in the asset table is mapped to another one or more of the asset records in the asset table through the relation defined in the relationship type table;
   a memory operable to store at least one program; and
   at least one processor communicatively coupled to the memory, in which the at least one program, when executed by the at least one processor, causes the at least one processor to:
   generate an exception report identifying a change in the inventory of assets;
   determine if additional information is required based on the change in the inventory of assets;
   identify a person responsible for providing the additional information; and
   remind the person to provide the additional information.

2. The system of claim 1 wherein the asset type represents a person in the organization and the authoritative data source is from a human resources group.

3. The system of claim 1 wherein the asset type represents a top-level administrative unit and the authoritative data source is from a finance group.

4. The system of claim 1 further comprising an entitlement relationship table comprising at least one record identifying a person entitled to change a relationship between a first asset and a second asset.

5. The system of claim 1 wherein the at least one processor is further caused to:
   identify a supervisor of the person responsible for providing the additional information; and
   send a reminder to the supervisor if the person has not provided the additional information within a predetermined period.

6. The system of claim 1, wherein the at least one asset record includes an administrative unit asset, the administrative unit asset representing an administrative unit in a hierarchically structured organization, wherein another one or more of the at least one asset record is mapped to the at least one asset record representing the administrative unit asset.

7. A computer readable storage medium having stored thereon computer executable instructions that, when executed on a computer, configure the computer to perform a method comprising the steps of:
   providing an asset database comprising an asset table including at least one asset record representing an asset, the at least one asset record characterized by an asset type, and a relationship type table comprising at least one record representing a relation between a first asset type and a second asset type, wherein one or more of the at least one asset record in the asset table is each mapped to another one or more of the at least one asset record in the asset table through a relation defined in the relationship type table;
   updating the asset database from a data feed from an authoritative data source;
   identifying a change in an inventory of the asset database;
   determining if additional information is required by the change in inventory;
   identifying a person responsible for providing the additional information based on the person's relationship to the changed inventory;
   receiving the additional information from the person; and
   updating the asset database with the additional information.

8. The computer readable storage medium of claim 7 wherein the step of identifying a change in an inventory further comprises comparing the data feed to an existing inventory of the asset database and identifying a difference between the data feed and the existing inventory of the asset database.

9. The computer readable storage medium of claim 7 wherein the step of determining if additional information is required further comprises:
   filtering the asset database on a changed asset and a relationship associated with the changed asset;
   determining if an object asset related to the changed asset by the relationship exists in the asset database; and
   determining that additional information is required if the object asset does not exist.

10. The computer readable storage medium of claim 7 wherein the step of determining if additional information is required further comprises:
    filtering the asset database on a changed asset and a required relationship associated with the changed asset; and
    determining that additional information is required if the required relationship does not exist.

11. The computer readable storage medium of claim 7 wherein the step of receiving the additional information from the person further comprises:
    reminding the person to provide the additional information;
    directing the person to a web page where the person can enter the additional information; and
    receiving the additional information from the web page.

12. The computer readable storage medium of claim 7 wherein the step of receiving the additional information from the person further comprises:
    identifying the person's supervisor; and
    notifying the person's supervisor of the person's failure to provide the additional information after a predetermined period.

13. The method of claim 7, wherein the at least one asset record includes an administrative unit asset, the administrative unit asset representing an administrative unit in a hierarchically structured organization, wherein another one or more of the at least one asset record is mapped to the at least one asset record representing the administrative unit asset.

14. An system, comprising:
    an asset database including
       an asset table with at least one asset record representing an asset, the at least one asset record characterized by an asset type, wherein the inventory module automatically creates assets from data feeds from authoritative data sources;
       a role type table comprising at least one role type record representing a role, the at least one role type record characterized by a role type; and
       a relationship type table with at least one relationship record representing a relation between a first asset type and a second asset type via the role type, wherein one or more of the asset records in the asset table is mapped to another one or more of the asset records in the asset table through the relation defined in the relationship type table;
    an inventory module to maintain inventory of assets and to update the at least one asset record in the asset database;
    a user interface module to provide access into the asset database:
    a memory operable to store at least one program; and
    at least one processor communicatively coupled to the memory, in which the at least one program, when executed by the at least one processor, causes the at least one processor to:
       generate an exception report identifying a change in the inventory of assets;
       determine if additional information is required based on the change in the inventory of assets;
       identify a person responsible for providing the additional information; and
       remind the person to provide the additional information.

15. The system of claim 14, wherein the user interface module generates alerts when changes in the inventory of assets are identified.

16. The system of claim 14 further comprising an orphan module to issue alerts when the relation between the first asset type and the second asset type for the asset no longer exists.

17. The system of claim 14, wherein the at least one asset record includes an administrative unit asset, the administrative unit asset representing an administrative unit in a hierarchically structured organization, wherein another one or more of the at least one asset record is mapped to the at least one asset record representing the administrative unit asset.

* * * * *